United States Patent
Sawayama et al.

[11] Patent Number: 5,579,142
[45] Date of Patent: Nov. 26, 1996

[54] LIQUID CRYSTAL DISPLAY DEVICE HAVING PLEOCHROIC DYE AND PARTICULAR RELATIONSHIP OF RATIO $D/P_O$ AND TWIST ANGLE

[75] Inventors: Yutaka Sawayama, Tenri; Masako Nakamura, Yamatokoriyama, both of Japan

[73] Assignee: Sharp Kabushiki Kaisha, Osaka, Japan

[21] Appl. No.: 542,663

[22] Filed: Oct. 13, 1995

[30] Foreign Application Priority Data

Oct. 14, 1994 [JP] Japan ................................ 6-249594
Jul. 24, 1995 [JP] Japan ................................ 7-187583

[51] Int. Cl.⁶ ........................... G02F 1/137; G02F 1/1335
[52] U.S. Cl. ........................... 359/102; 359/78; 359/70; 359/98
[58] Field of Search ........................... 359/58, 59, 60, 359/70, 75, 78, 98, 99, 101, 102

[56] References Cited

U.S. PATENT DOCUMENTS

| | | | |
|---|---|---|---|
| 4,143,947 | 3/1979 | Aftergut et al. | 359/102 |
| 4,272,162 | 6/1981 | Togashi et al. | 359/98 |
| 4,579,425 | 4/1986 | Ishii et al. | 359/98 |
| 4,596,446 | 6/1986 | Waters et al. | 350/346 |
| 4,608,558 | 8/1986 | Amstutz et al. | 359/102 |
| 4,653,865 | 3/1987 | Kando et al. | 359/102 |
| 4,697,884 | 10/1987 | Amstutz et al. | 359/102 |
| 5,204,765 | 4/1993 | Mitsui et al. | 359/70 |

FOREIGN PATENT DOCUMENTS

| | | |
|---|---|---|
| 59-28130 | 2/1984 | Japan . |
| 1-156725 | 6/1989 | Japan . |
| 3-41420 | 2/1991 | Japan . |
| 4-243226 | 8/1992 | Japan . |

*Primary Examiner*—William L. Sikes
*Assistant Examiner*—Tai V. Duong
*Attorney, Agent, or Firm*—David G. Conlin; William J. Daley, Jr.; Dike, Bronstein, Roberts, Cushman, LLP

[57] ABSTRACT

A liquid crystal display device of the present invention includes: a pair of substrates, at least one of which is transparent; and a liquid crystal layer interposed between the pair of substrates, the liquid crystal layer having a helical structure including: a liquid crystal material having a positive dielectric constant anisotropy; a pleochroic dye; and at least one of a cholesteric liquid crystal material and a chiral agent as an optical active material, wherein the liquid crystal layer has a helical axis in a thickness direction of the liquid crystal layer, and longitudinal axes of liquid crystal molecules in a vicinity of the pair of substrates are substantially parallel to the substrates, a ratio of a natural pitch ($p_0$) and a thickness (d) of the liquid crystal layer of the helical structure satisfies a relationship: $(2\theta-\pi)/4\pi < d/p_0 \leq \theta/2\pi$, where a twisted angle of the helical structure is $\theta$ rad, and the twisted angle $\theta$ rad of the helical structure is within a range: $2\pi \infty \theta \leq 5\pi/2$.

9 Claims, 17 Drawing Sheets

Orientation of HWT        Orientation of AWT $(0.8 \leq d/p_0 \leq 1.2)$
$\tau_r = 53.49$ [msec]
$\tau_d = 46.51$ [msec]

$(d/p_0 > 1.2)$
$\tau_r = $ ——
$\tau_d = 58.14$ [msec]

$(d/p_0 < 0.8)$
$\tau_r = 58.14$ [msec]
$\tau_d = $ ——

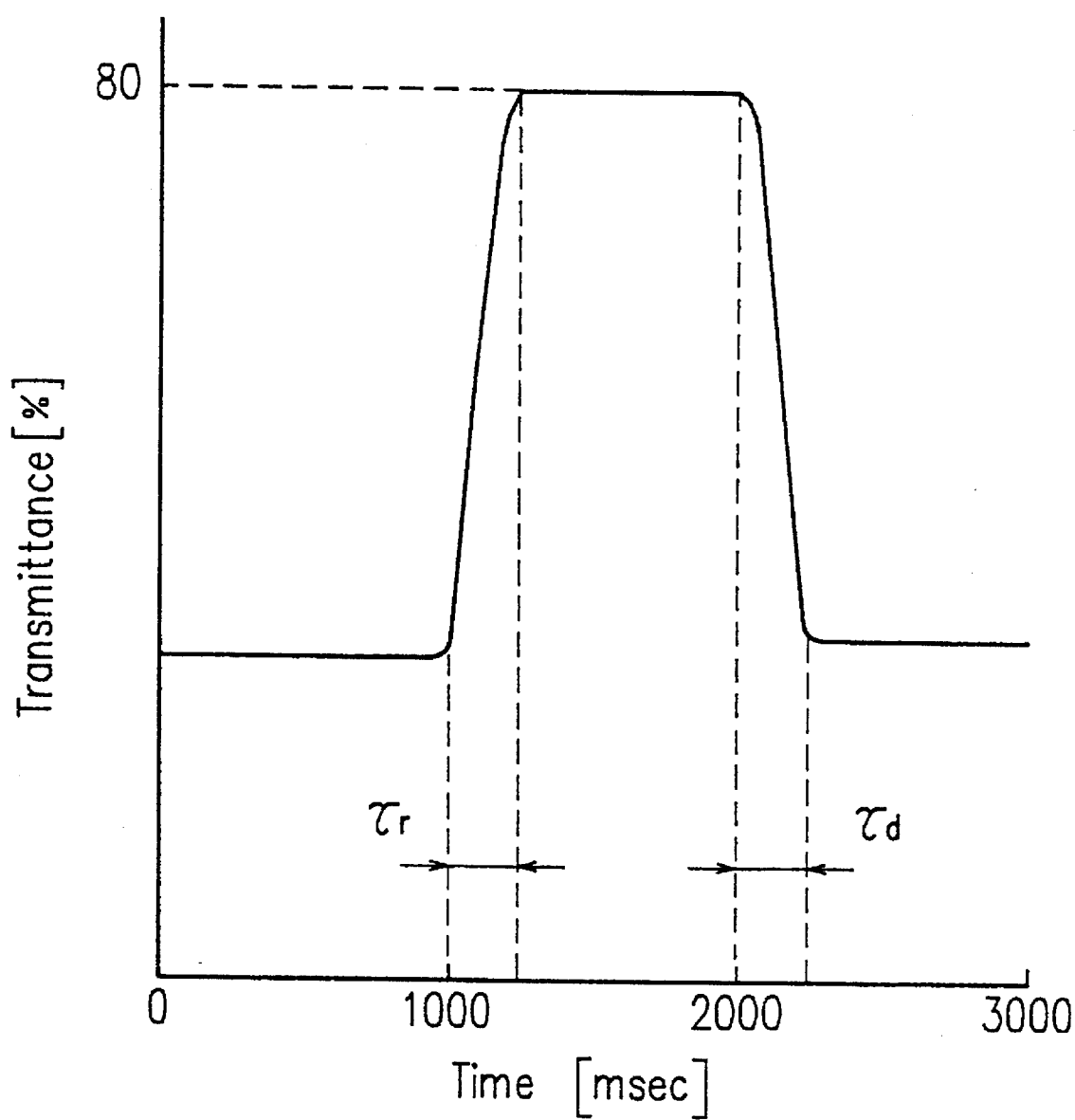

LIQUID CRYSTAL DISPLAY DEVICE HAVING PLEOCHROIC DYE AND PARTICULAR RELATIONSHIP OF RATIO D/P$_O$ AND TWIST ANGLE

BACKGROUND OF THE INVENTION

1. Field of the Invention

The present invention relates to a liquid crystal display device. In particular, the present invention relates to a liquid crystal display device which has a reduced driving voltage and improved response characteristics and high contrast ratio.

2. Description of the Related Art

A reflection type liquid crystal display device does not require back light since it utilizes ambient light as a light source. Therefore, it is possible to make the most of the advantages of a liquid crystal display device such as being lightweight, having thin body, and low power consumption. However, the brightness of a display screen is limited since the reflection type liquid crystal display device utilizes ambient light as a light source. Moreover, in the case where a polarizing plate, a color filter or the like is used, display brightness is considerably lowered, resulting in a dark display.

In order to solve the above problem, a reflection type STN (Super Twisted-Nematic) mode for optimizing a retardation; as small a number as possible of polarizing plates to be used, for example, one polarizing plate; or a Guest-Host (hereinafter, referred to as GH) mode using a liquid crystal material containing a pleochroic dye (dichroic dye) are conventionally adopted.

In particular, since no polarizing plate is used in a phase-transition type GH (also called White-Taylor type Guest-Host, and hereinafter, referred to as WT) mode utilizing phase transition between a nematicphase and a cholesteric phase, a brighter display is obtained as compared with a liquid crystal display device using other modes.

In a liquid crystal layer of the liquid crystal display device in a WT mode of a certain kind, liquid crystal molecules near the surfaces of substrates are perpendicularly oriented, and a helical pitch of a cholesteric phase is small. Specifically, d/p>2 is satisfied, where a thickness of a cell (thickness of a liquid crystal layer) is d and a helical pitch is p. Hereinafter, the WT mode in which liquid crystal molecules at the interfaces with the substrates are perpendicularly oriented is abbreviated as an HWT (homeotropic WT) mode.

FIG. 3A shows voltage-transmittance characteristics in this HWT mode, and FIGS. 13A through 13C show the orientation states in the HWT mode corresponding to the ranges of applied voltage A, B and C, respectively. FIG. 13A shows the orientation state (initial state) when an applied voltage is within the range A in FIG. 3A, FIG. 13B shows the orientation state when an applied voltage is within the range B in FIG. 3A, and FIG. 13C shows the orientation state when an applied voltage is within the range C in FIG. 3A. In FIGS. 13A to 13C, liquid crystal molecules and pleochroic dyes are not distinguishably shown. FIGS. 13A to 13C show the orientation states of the whole mixture of the liquid crystal molecules and pleochroic dye molecules.

Moveover, as a reflective pixel electrode structure using a two-terminal element which is used in such a reflection type liquid crystal device, there is a reflective pixel electrode structure disclosed in Japanese Laid-Open Patent Publication No. 3-41420. Japanese Laid-Open Patent Publication No. 3-41420 discloses a method for fabricating a reflective pixel electrode by forming a metal film on a flat interlayer insulating film through vapor deposition and then etching the surface of the metal film.

In the case of HWT mode, by mixing an optical active material with liquid crystal molecules, which tend to perpendicularly orientate by themselves, the orientation of the liquid crystal molecules is controlled so that a helical axis of LC molecules in an intermediate region (bulk) of the liquid crystal layer is aligned to be substantially perpendicular to the substrate.

When a voltage is applied to the liquid crystal cell (the liquid crystal layer) of HWT mode, the orientation state changes from that shown in FIGS. 13A to that of 13C passing through an intermediate scattered state shown in FIG. 13B. Due to this change, a threshold voltage is not clearly exhibited. Moreover, a scattered state exists over a wide range B of low voltage as shown in FIG. 3A.

As described above, an initial orientation state is easily disordered and transits to a scattered state at an extremely low voltage. In addition, a decreased helical pitch so as to enhance light-shielding properties results in a high driving signal voltage. Therefore, a dynamic range (a range of voltage levels) of a signal voltage is increased, causing the following problems.

(1) First, in the case of an active matrix type LCD using a thin film transistor (hereinafter, referred to as TFT), a TFT having a high break down voltage (a voltage at which an element is broken) is required to be used. Moreover, the active matrix type LCD is disadvantageous in that the cost of the display device itself is increased due to increase in the signal voltage level.

(2) Second, when a two-terminal element which is advantageous in terms of cost is used as a switching element of an active matrix type LCD, since it is difficult to set a signal voltage applied to a liquid crystal layer at 0 V in an off state, a voltage is undesirably applied to some degree. Thus, in combination of HWT mode in which the initial orientation of liquid crystal molecules is disordered by an extremely low voltage with a two-terminal element, the orientation of the liquid crystal molecules is scattered even in an off state. Therefore, it is difficult to obtain a liquid crystal display device having good display characteristics.

(3) Third, in an HWT mode, the initial orientation state is easily disordered by an extremely small voltage. Thus, when the liquid crystal display device is driven by TFTs, it is impossible to decrease the power consumption by using a driving method, for example, for applying a certain voltage to a liquid crystal layer from an electrode on a side of the counter substrate which does not have an active element so as to decrease the dynamic range of the signal voltage.

Therefore, it is impossible to realize good display quality by applying a switching element such as a TFT and a two-terminal element to a conventional HWT type liquid crystal display mode. Moreover, the conventional liquid crystal display devices are disadvantageous in that various conditions such as a tilt angle of liquid crystal molecules and a ratio of a thickness of the liquid crystal layer to a helical pitch (d/p) should be optimized.

Furthermore, as shown in FIG. 16B, a light reflecting layer 5 is formed on a glass substrate 1b so as to be in contact with a liquid crystal layer 4 as a reflective plate, whereby good display without parallax is obtained. In FIGS. 16A and 16B, a glass substrate 1a on the bottom face of which an ITO film 2 is formed and the glass substrate 1b facing the glass substrate 1a interpose the liquid crystal layer 4. A light beam emitted from a light source 22 is reflected by the light reflecting layer 5 and reaches an observer 26 through an optical path 27.

As the characteristics required for the light reflecting film 5, the following can be listed.

(1) Scattering characteristics to some degree.

(2) Light reflection characteristics having directivity to some degree.

(3) Formation of a height, a size and a pitch of convex portions (not shown) on the surface of light reflecting layer in a random manner so as to avoid coloring.

The reason for the above point (3) is because coloring occurs due to interference between light beams reflected by the adjacent convex portions when a height, a size and a pitch of convex portions are uniformly formed.

In order to satisfy the above conditions, it is effective that the light reflecting layer has a circular surface or an elliptical surface having a longitudinal axis or a diameter of a bottom of a convex portion in the range of 3 to 50 µm. Moreover, it is effective that the distance between the adjacent convex portions is 1 µm or more, and the convex portions having the above shape is placed in a random manner.

Regarding the diameter in a height direction of the convex portion on the surface of the light reflecting layer, since convex and concave portions are formed on the interfaces between the light reflecting layer and the liquid crystal layer, the convex and concave portions on the interfaces induce a nonuniform thickness of the liquid crystal layer. The non-uniformity should be limited within the range where the orientation of the liquid crystal molecules in an AWT (Antiparallel WT) mode are not affected. In this case, the tip of the convex or concave portion of the light reflecting layer should have a circular or an elliptical shape so as to realize good diffuse reflection. The above-mentioned AWT mode denotes a WT mode in which liquid crystal molecules on the interfaces of the substrates are orientated approximately parallel, and is distinguished from the HWT mode.

Furthermore, as the result of converting a margin of a ratio ($d/p_0$) of a thickness of the cell and a natural pitch of the helical structure into a margin of the thickness of the cell, a margin of the nonuniformity $\Delta d$ of the thickness d of the cell is $|\Delta d| \leq 1.0$ µm. Therefore, the central portion in a height direction of the convex portion of the light reflecting layer is set to be an average thickness of the cell. Then, in the range of ±0.5 µm from the average thickness of the cell, that is, if a height of the convex portion is 1 µm or less, the light reflecting layer can be formed without adversely affecting the orientation of the liquid crystal molecules.

From the examination based on these experiments, it is desirable that the light reflecting layer has a height of 1 µm or less and a circular or elliptical shape having a diameter or a longitudinal axis of the bottom of the convex portion in the range of 3 to 50 µm and a pitch of the adjacent convex portions of 1 µm or more.

It is difficult to control such strict conditions with high precision by a method for etching the metal film as described in Japanese Laid-Open Patent Publication No. 3-41420.

As methods of an improved WT type liquid crystal display device for driving a liquid crystal display device without using switching elements, there are techniques described in USP. 4596446 and Japanese Laid-Open Patent Publication No. 59-28130. Since the conditions optimal for simple matrix driving are set, only the region where hysterisis does not occur, that is, the region where a twisted angle is in the range of π to 2π rad serves as the liquid crystal display. Moreover, in the case where the liquid crystal display device is used in GH mode containing pleochroic dyes mixed therein, the techniques are disadvantageous in that absorption of light does not sufficiently occur, thereby lowering the contrast.

Furthermore, in the case where the reflective plate is placed, parallax due to the thickness of the glass substrate $1b$ occurs with a conventional external attachment method, that is, a method for placing the reflective plate 5 on the bottom of the liquid crystal cell, thereby remarkably lowering the viewing characteristics.

SUMMARY OF THE INVENTION

The liquid crystal display device of this invention, includes: a pair of substrates, at least one of which is transparent; and a liquid crystal layer interposed between the pair of substrates. The liquid crystal layer having a helical structure includes: a liquid crystal material having a positive dielectric constant anisotropy; a pleochroic dye; and at least one of a cholesteric liquid crystal material and a chiral agent as an optical active material, wherein the liquid crystal layer has a helical axis in a thickness direction of the liquid crystal layer, and longitudinal axes of liquid crystal molecules in a vicinity of the pair of substrates are substantially parallel to the substrates, a ratio of a natural pitch ($p_0$) and a thickness (d) of the liquid crystal layer of the helical structure satisfies a relationship: $(2\theta-\pi)/4\pi < d/p_0 \leq \theta/2\pi$, where a twisted angle of the helical structure is $\theta$ rad, and the twisted angle $\theta$ rad of the helical structure is within a range: $2\pi \leq \theta \leq 5\pi/2$.

In one embodiment of the present invention, one of the pair of substrates further includes an active element for switching a voltage applied to the liquid crystal layer.

In another embodiment of the present invention, the active element is a non-linear element which is selected from a group consisting of a MIM, a diode, a varistor, and a thin film transistor (TFT).

In still another embodiment of the present invention, one of the pair of substrates has a reflective pixel electrode which is provided so as to be in contact with the liquid crystal layer, and wherein the reflective pixel electrode consisting of an insulating film having a ragged surface and a metal reflective film which is formed so as to replicate the ragged surface of the insulating film.

In still another embodiment of the present invention, the twisted angle $\theta$ of the helical structure is about $9\pi/4$.

In still another embodiment of the present invention, each of the pair of substrates has an alignment film which is formed such that a pretilt angle of the liquid crystal molecules constituting the liquid crystal layer is within a range of 5° to 20°.

In the present invention, a liquid crystal layer interposed between a pair of substrates is constituted so that liquid crystal molecules in the vicinity of the interfaces with the substrates are oriented substantially parallel to the respective substrates. Moreover, the liquid crystal molecules of the liquid crystal layer has a helical structure having a helical axis in a thickness direction of the liquid crystal layer owing to an optical active material. Therefore, even when a voltage to some degree is applied to the liquid crystal layer in an off state, the orientation of the liquid crystal molecules are not disordered. It is not until application of a voltage equal to or higher than a threshold voltage that a pitch of the helical structure rapidly extends. Therefore, the dynamic range of the signal voltage can be set within a narrow range including the threshold voltage.

Moreover, since the orientation of the liquid crystal molecules is not disordered even when a voltage to some degree is applied to the liquid crystal layer in an off state, a two-terminal element, with which it is difficult to perfectly reduce the voltage applied to the liquid crystal layer to zero, can be used as a driving element of the liquid crystal display device. Therefore, the cost can be reduced.

Moreover, a ratio of a natural pitch ($p_0$) which occurs due to an optical active material and a thickness (d) of a cell of the helical structure satisfies the following relationship: $(2\theta-\pi)/4\pi < d/p_0 \leq \theta/2\pi$, where a twisted angle of the helical structure is $\theta$ rad, and the twisted angle $\theta$ rad of the helical structure is within the range: $2\pi \leq \theta \leq 5\pi/2$. Therefore, by applying a predetermined voltage to the liquid crystal layer, phase transition of the liquid crystal suddenly occurs. When the voltage applied to the liquid crystal layer is turned off, the liquid crystal molecules rapidly and certainly return their original state. As a result, sufficiently rapid response characteristics can be obtained.

By using the two-terminal element as described above, more rapid electro-optical characteristics can be obtained. A display capacity, that is, the number of pixels which can be driven by a signal having a constant duty ratio can, be increased.

In the present invention, the reflective pixel electrode consists of an insulating film having a ragged surface formed on the surface of the substrate and a metal reflective film formed on the insulating film so as to replicate the irregular shape of the insulating film. Therefore, it is possible to form the pattern having an irregular shape with high precision, for example, by photolithography technique using a photosensitive resin film. Therefore, the light reflecting layer having the ragged surface is formed under the strict conditions required for the light reflecting layer, for example, under the control of a pitch of a height of the convex portion with high precision.

Thus, the invention described herein makes possible the advantages of providing a liquid crystal display device with good response characteristics, a bright display, high contrast and good viewing characteristics, which is capable of being driven at a low voltage and being fabricated at low cost.

These and other advantages of the present invention will become apparent to those skilled in the art upon reading and understanding the following detailed description with reference to the accompanying figures.

BRIEF DESCRIPTION OF THE DRAWINGS

FIG. 3A shows voltage-transmittance characteristics of HWT mode; and FIG. 3B shows voltage-transmittance characteristics of AWT mode.

FIG. 10A shows the configuration in which a reflective electrode is in contact with a pixel electrode; and FIG. 10B shows the configuration in which the reflective electrode is directly connected to an output terminal of a switching element.

FIGS. 13A to 13C show the initial orientation state, the orientation state upon application of an extremely small voltage, and the orientation state while a liquid crystal display device is turned on, respectively, in HWT; and FIGS. 13D to 13F show the initial orientation state, the orientation state upon application of an extremely small voltage, and the orientation state while a liquid crystal display device is turned on, respectively, in AWT.

FIG. 14A shows response characteristics of a liquid crystal cell when $d/p_0=0.99$; FIG. 14B shows response characteristics of a liquid crystal cell when $d/p_0=1.1$; and FIG. 14C shows response characteristics of a liquid crystal cell when $d/p_0=0.75$.

FIG. 15 is a graph for showing response characteristics of a liquid crystal cell in HWT mode.

FIG. 16A shows the relationship in the case where the light reflecting layer is externally attached; and FIG. 16B shows the relationship in the case where the light reflecting layer is provided so as to be in contact with a liquid crystal layer.

FIG. 19A shows the case where an alignment film material J with a pretilt angle 1° is used; and FIG. 19B shows the case where an alignment film material K with a pretilt angle 5° is used.

DESCRIPTION OF THE PREFERRED EMBODIMENTS

First, the basic principle of the present invention will be described.

Figure 3A:
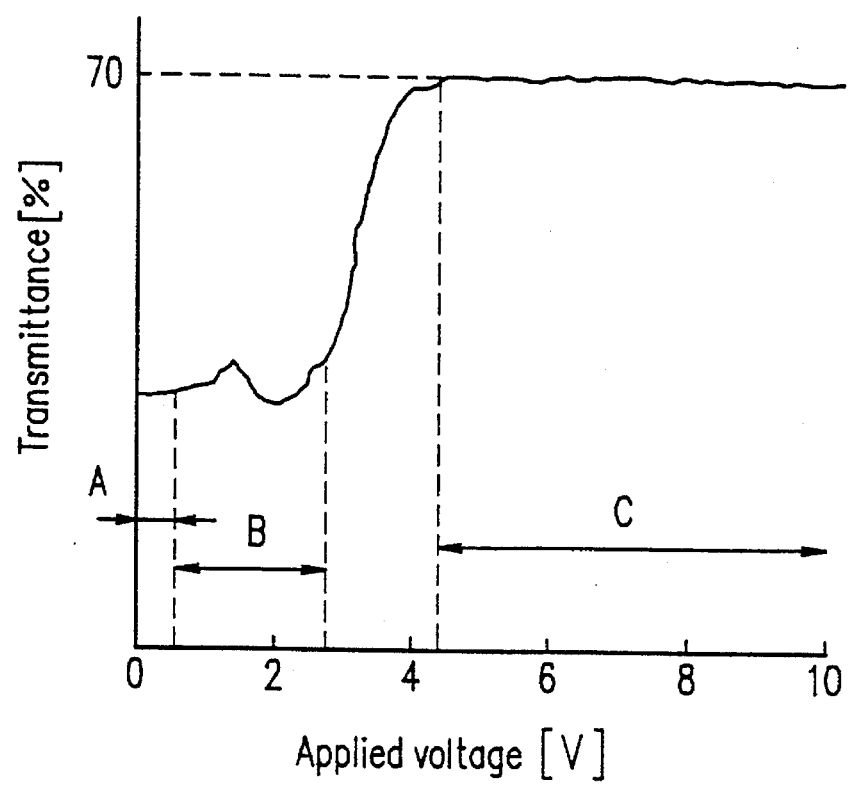
FIGS. 3A and 3B are graphs showing voltage-transmittance characteristics of HWT mode and AWT mode for comparison.
Figure 3B:
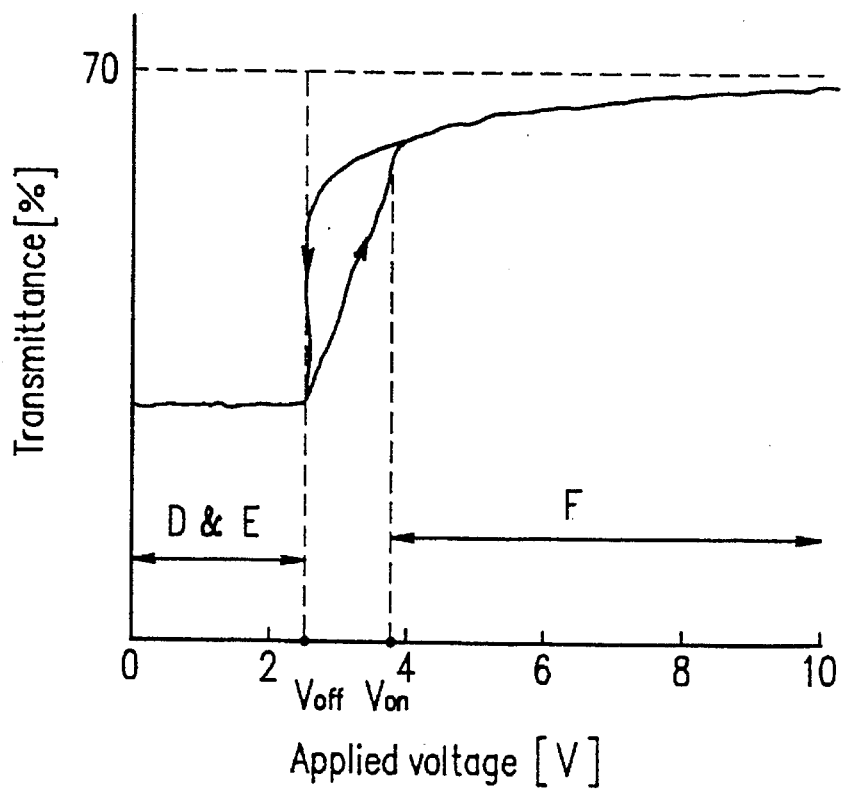
Figure 13A:
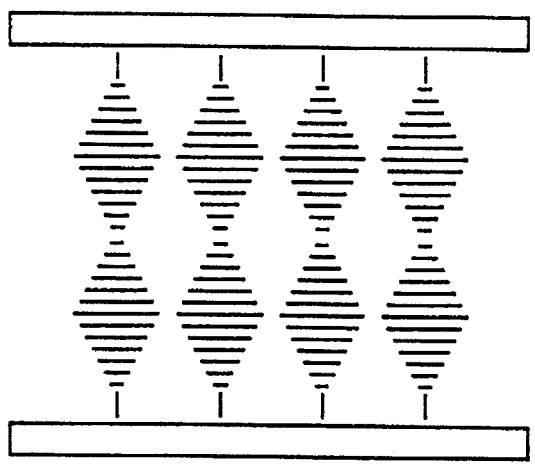
FIGS. 13A to 13F show the initial orientation state and the change in orientation upon application of a voltage, for comparison between HWT mode and AWT mode.
Figure 13D:
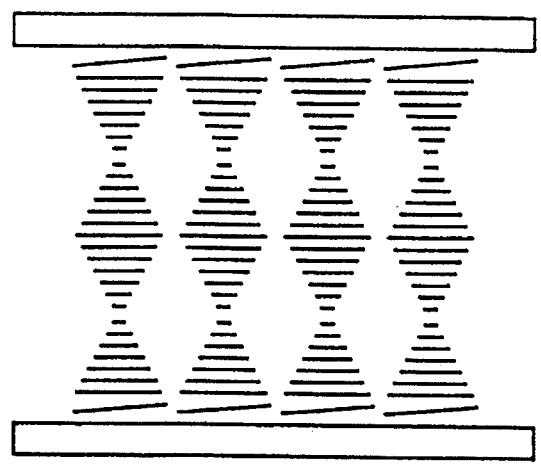
Figure 13B:
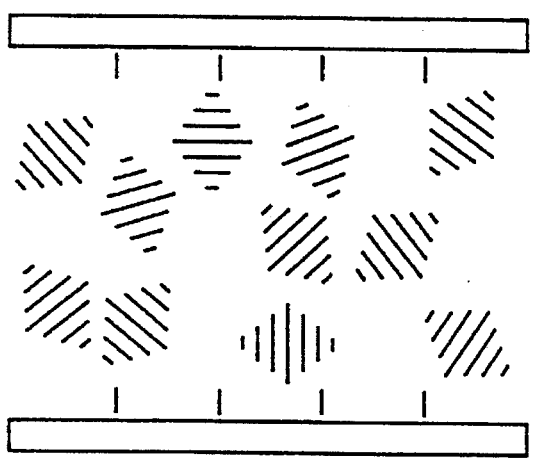
Figure 13E:
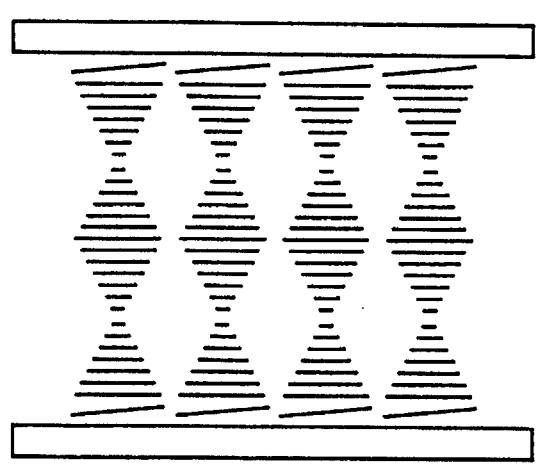
Figure 13C:
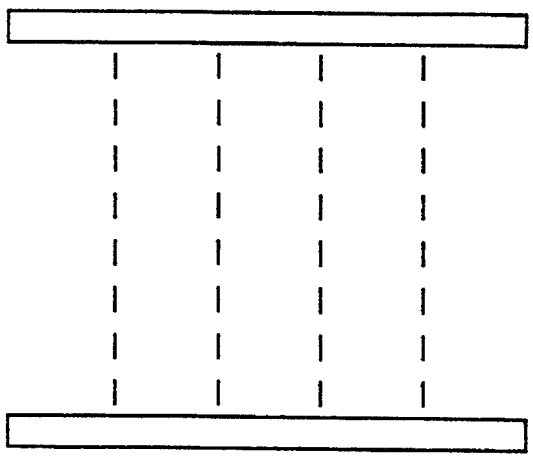
Figure 13F:
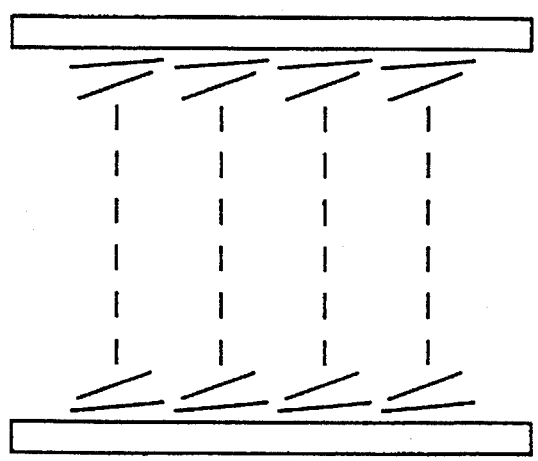

FIG. 3B shows voltage-transmittance characteristics in an AWT mode, and FIGS. 13D through 13F show the orientation states in the AWT mode so as to correspond to the applied voltage ranges D, E and F in FIG. 3B, respectively. Specifically, FIGS. 13D and 13E show the orientation states where an applied voltage is in the ranges D and E in FIG. 3B, and FIG. 13F shows the orientation state where an applied voltage is in the range F in FIG. 3B. In FIGS. 13D through 13F, liquid crystal molecules and pleochroic dyes are not distinguishably shown. FIGS. 13D through 13F respectively shows the orientation states of the whole mixture of the liquid crystal molecules and pleochroic dyes.

In the AWT mode of the present invention, the liquid crystal molecules of a liquid crystal layer in the vicinity of surfaces of substrates are orientated so as to be substantially parallel to the surface of the substrate. Therefore, the liquid crystal molecules in a bulk portion of the liquid crystal layer form a helical structure in a more stable state as compared with the case of HWT mode. Thus, even if a voltage to a certain degree is applied to the liquid crystal layer in an off state, the orientation state of the liquid crystal molecules is not disordered and is stably held unchanged. It is not until application of a voltage equal to or higher than a threshold voltage that the orientation state of the liquid crystal molecules changes, that is, the pitch of the helical structure rapidly extends. As a result, sudden and definite threshold voltage characteristics can be obtained. Since the liquid crystal molecules used for a LCD in an AWT mode have a positive dielectric anisotropy, the liquid crystal molecules are likely to be orientated parallel to the electric field applied to the liquid crystal layer.

Figure 14A:
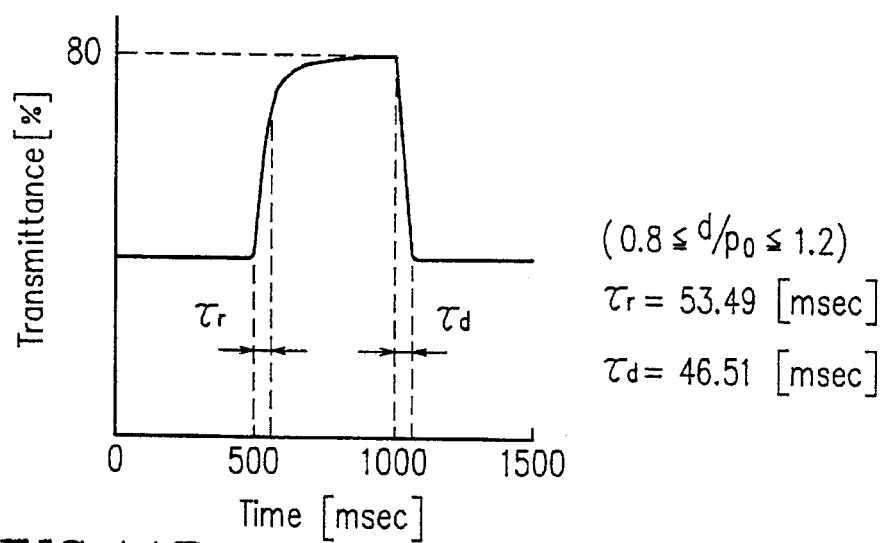
FIGS. 14A to 14C are graphs for showing response characteristics of a liquid crystal cell in AWT mode.
Figure 14B:
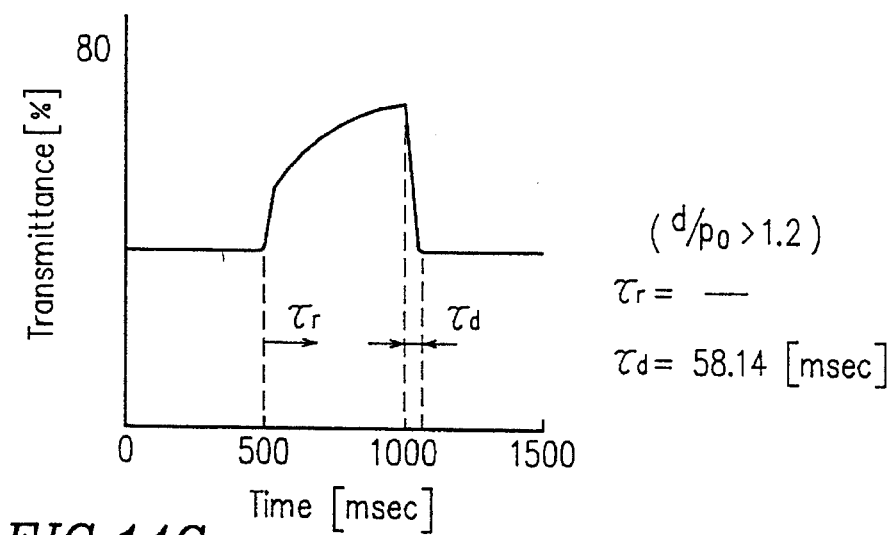
Figure 14C:
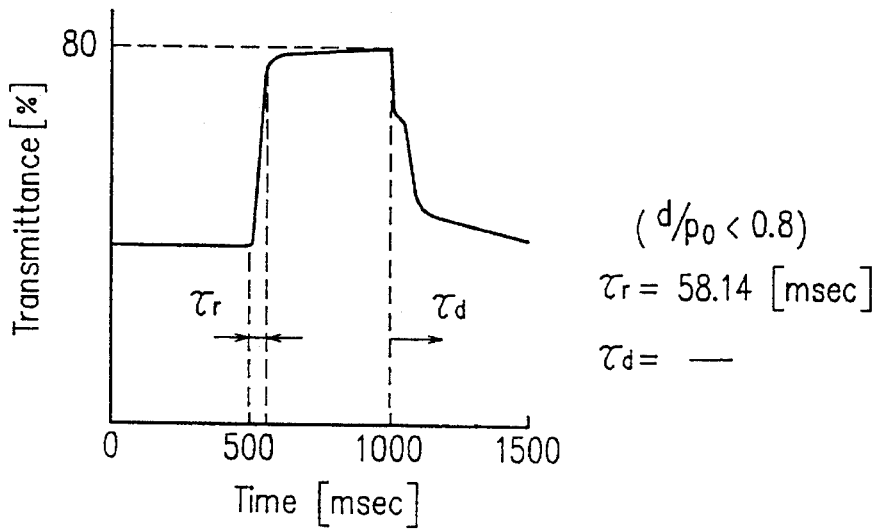

The way that characteristics change depends on a ratio of a natural pitch ($p_0$) and a thickness (d) of the cell. FIGS. 14A through 14C show response characteristics when $d/p_0$ is varied while setting a twisted angle θ of the helical structure at 2π.

From FIGS. 14A through 14C, it is understood that liquid crystal molecules slowly rise in the case of $d/p_0 > 1.2$ since the liquid crystal molecules do not sufficiently operate at a predetermined voltage (the voltage is constant in FIGS. 14A through 14C) (see FIG. 14B).

In the case of $d/p_0 < 0.8$, a region which is twisted at 180° is generated when an off bias is applied to the liquid crystal layer. Therefore, it is understood that a sufficient off state, that is, the state in which a transmittance of the liquid crystal layer is reduced to a sufficiently small value, is not obtained (see FIG. 14C).

In the case where the twisted angle θ of the helical structure is 2π, it is understood that the preferable range of $d/p_0$ is $0.8 \leq d/p_0 \leq 1.2$ for the liquid crystal layer of AWT mode (see FIG. 14A).

When the same measurement is carried out while varying the twisted angle θ, the excellent optical characteristics are obtained under the following conditions.

(1) The twisted angle θ: $2\pi \leq \theta \leq 5\pi/2$ (Formula 1)

(2) Thickness of cell/natural pitch $d/p_0$ : $(2\theta-\pi)/4\pi < d/p_0 < \theta/2\pi$ (Formula 2)

Under the conditions of (1) and (2), even if a voltage is applied to the liquid crystal layer in an AWT mode, the orientation state does not change from the initial orientation state as long as the applied voltage is equal to or lower than a threshold voltage. When a voltage which is applied as an off bias is equal to or lower than a threshold voltage, the response characteristics are the same as those shown in FIG. 14A. In this case, the sum of a raise response time $\tau_r$ and a decay response time $\tau_d$ is 100 msec. It is confirmed that this value is one-third or less of 340 msec which is the sum of a raise response time and a decay response time in an HWT mode shown in FIG. 15.

On the other hand, Japanese Laid-Open Patent Publication No. 4-243226 describes a method for fabricating a reflective pixel electrode having a ragged surface. In this method, a photosensitive resin applied onto an insulating substrate is selectively removed through patterning in a photolithography process, and then subjected to a thermal treatment. Thereafter, a thin metal film is formed on the entire surface of the electrode, thereby completing the reflective pixel electrode.

If this process is used, a diffuse reflection plate used for the reflection type liquid crystal display device can be fabricated, controlling the required strict conditions with high reproducibility. In addition, the diffuse reflection plate thus formed can be easily combined with a switching element for driving the liquid crystal display device, in particular, a two-terminal element.

As described above, according to the present invention, it is possible to realize a liquid crystal cell in a bright display mode, which has electro-optic characteristics having a definite threshold value and sufficiently rapid response characteristics, is capable of being driven at a low voltage and has the unchanged orientation state of liquid crystal molecules under application of an off bias. Since the driving voltage is low, the liquid crystal cell can be combined with active elements such as TFTs and two-terminal elements.

Furthermore, by providing a reflective pixel electrode having good diffuse reflection characteristics so as to be in contact with a liquid crystal layer, a reflection type liquid crystal display device having uniform orientation and display characteristics of small parallax, a bright display and high contrast can be obtained at low cost.

Hereinafter, examples of the present invention will be described by way of illustrative examples.

Example 1

Figure 1A:
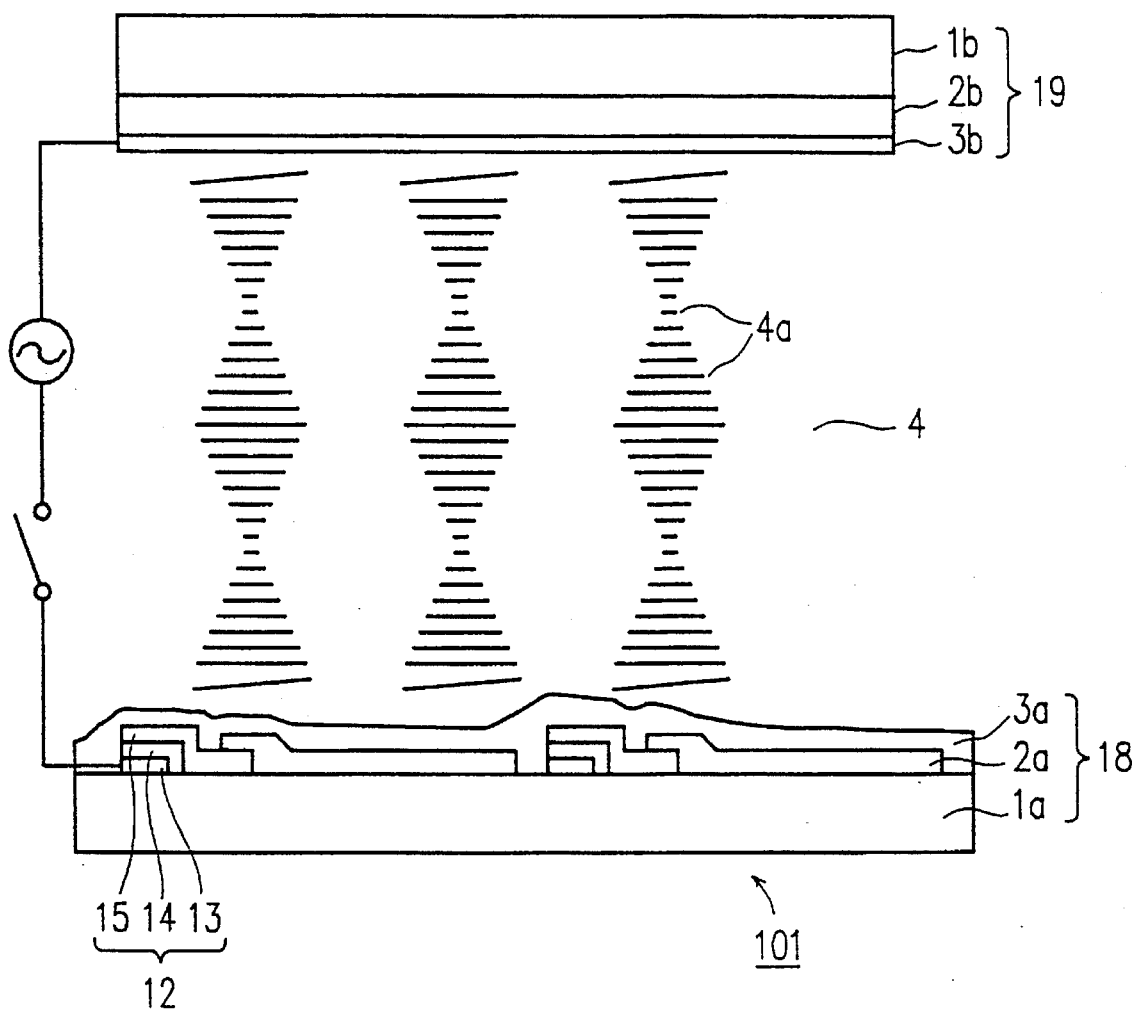
FIG. 1A is a cross-sectional view for illustrating the configuration of a transmission type liquid crystal display device including a two-terminal element in AWT mode according to Example 1 of the present invention.
Figure 1B:
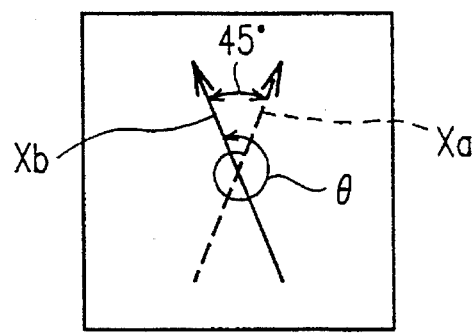
FIG. 1B shows a rubbing direction of a pair of substrates constituting the liquid crystal display device shown in FIG. 1A.

FIGS. 1A and 1B illustrate a liquid crystal display device according to Example 1 of the present invention. FIG. 1A shows a cross-sectional structure of the liquid crystal display device, and FIG. 1B shows a rubbing direction of a pair of substrates constituting the liquid crystal display device. FIGS. 2A through 2E are cross-sectional views showing a method for fabricating one of the pair of substrates, which has a two-terminal element. In FIG. 1A, liquid crystal molecules and pleochroic dyes are not distinguishably shown.

In FIG. 1A, the reference numeral 101 denotes a transparent type liquid crystal display device according to Example 1. The transparent type liquid crystal display device 101 includes a back substrate 18 on which a thin film diode (hereinafter, also referred to as TFD) 12 is mounted and a front substrate 19 which is placed so as to face the back substrate 18.

The thin film diode 12 consists of a Ta (tantalum) wiring 13, a Ta$_2$O$_5$ (tantalum oxide) insulating layer 14 and a Ti (titanium) electrode 15 which are successively deposited onto a glass substrate 1a constituting the back substrate 18. On the glass substrate 1a a pixel transparent electrode 2a made of indium-tin oxide (ITO) so as to be in contact with the Ti electrode 15. On the entire glass substrate 1a an alignment film 3a is formed so as to cover the thin film diode 12 and the pixel transparent electrode 2a. A stripe-shaped ITO film 2b is formed on the glass substrate 1b constituting the front substrate 19. An alignment film 3b is formed so as to completely cover the stripe-shaped ITO film 2b.

A liquid crystal layer 4 is interposed between the back substrate 18 and the front substrate 19. The liquid crystal layer 4 is in an AWT mode in which liquid crystal molecules 4a at the interfaces with the substrates 18 and 19 are aligned so as to be substantially parallel to the surface of the substrate. In the specification of the present application, the term "antiparallel" denotes not only antiparallel in a strict sense taking a pretilt direction into consideration but also parallel. The orientation directions of the liquid crystal molecules are not necessarily parallel to the facing substrates, respectively. In the specification, the term "antiparallel" can be used as long as the liquid crystal molecules on the pair of substrates are substantially parallel to the surfaces of the respective substrates.

A liquid crystal material used in this example is ZLI-4792 (trade name) fabricated by Merck Co., Ltd. in which anthraquinone and an azoic type black pleochroic dye are mixed. In the liquid crystal material, S-811 (trade name) fabricated by Merck Co., Ltd. serving as a chiral agent which is a kind of an optical activator is mixed at about 1.65 wt %. A twisted angle θ of orientation of the liquid crystal molecules is 9π/4 rad (45 degrees) as shown in FIG. 1B, and a ratio d/p$_0$ is 0.99. Moreover, a retardation (Δn·d) of the liquid crystal layer is 391 nm in the liquid crystal material, so that an incident light beam can pass the liquid crystal layer without being optically rotated in a form following the twist of the orientation of liquid crystal molecules or in a form close to such a form. Herein, Δn is a birefringence of liquid crystal molecules, and d is a thickness of a cell. In FIG. 1B, Xa is a rubbing direction of the back substrate 18, and Xb is a rubbing direction of the front substrate 19.

Next, a fabrication method of the liquid crystal display device will be described.

Figure 2A:
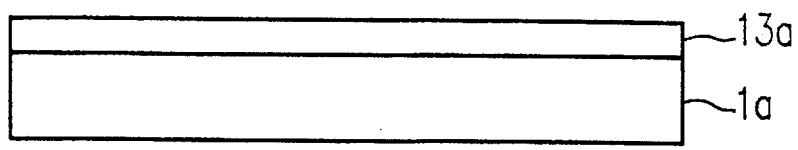
FIGS. 2A to 2E are cross-sectional views showing a fabrication method of a back substrate having an active element in order of steps, which constitutes the liquid crystal display device according to Example 1.

First, a method for fabricating the back substrate 18 on which the thin film diode 12 is mounted will be described. First, a Ta thin film 13a is formed on the glass substrate 1a to a thickness of about 300 nm by sputtering (FIG. 2A).

Figure 2B:
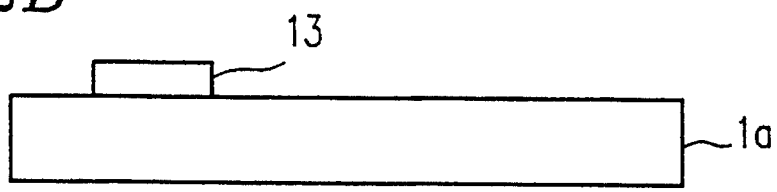

Next, the Ta thin film 13a is processed into a desired shape by photolithography so as to form the Ta wiring 13 (FIG. 2B).

Figure 2C:
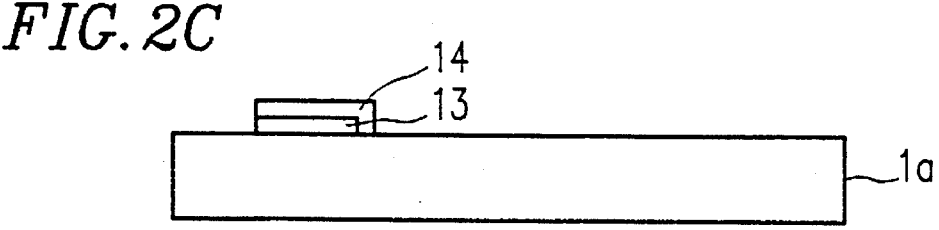

Subsequently, the surface of the Ta wiring 13 is anodized so as to form the insulating layer 14 made of Ta$_2$O$_5$ to a thickness of about 60 nm (FIG. 2C).

Figure 2D:
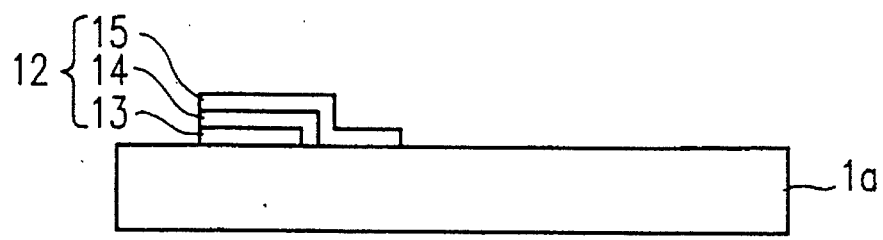

Thereafter, a Ti film is formed on the Ta$_2$O$_5$ insulating layer 14 by sputtering, and then the Ti film is processed into a desired shape by photolithography, thereby forming the Ti electrode 15 (FIG. 2D). By the above process, the thin film diode 12 is formed on the glass substrate 1a.

Figure 2E:
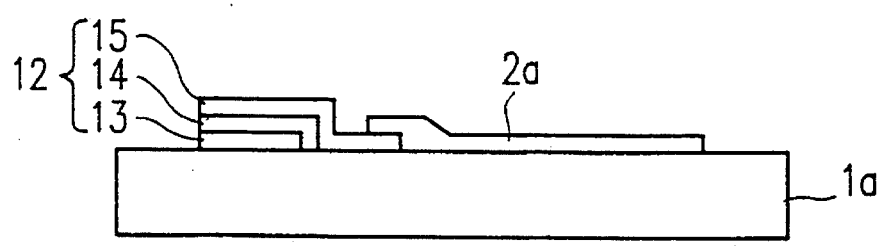

Finally, the pixel transparent electrode 2a connected with the Ti electrode 15 is formed by forming an ITO film and patterning of the ITO film (FIG. 2E).

Optomer AL4552 (trade name) fabricated by Japan Synthetic Rubber Ltd. is applied onto the entire surface of the thus fabricated glass substrate 1a as an alignment film material, and then is burned at 180° C. for one hour, thereby forming the liquid crystal alignment film 3a.

On the other hand, for the front substrate 19, an ITO film is formed on the glass substrate 1b and is shaped into a striped ITO film 2b by patterning. Thereafter, similarly to the glass substrate 1a on the side of the back substrate, Optomer AL4552 is applied as an alignment film material, and then is burnt at 180° C. for one hour, thereby forming the liquid crystal alignment film 3b.

Thereafter, a rubbing treatment is conducted so that the orientation directions of liquid crystal molecules at the liquid crystal alignment films 3a and 3b of the glass substrates 1a and 1b form π/4 rad in a lefthand direction.

Thereafter, glass bead spacers having a diameter of 4.5 μm are diffused in one of the back substrate 18 and the front substrate 19. Then, an adhesive sealing material in which glass fibers having a diameter of 5 μm is screen-printed as a liquid crystal sealing layer. The substrates 18 and 19 are attached to each other so that the Ta signal line (wiring) 13 of the back substrate 18 and the stripe-shaped ITO film 2b of the front substrate 19 perpendicularly cross in a matrix form. Then, a liquid crystal material is injected between the substrates 18 and 19 by vacuum injection, thereby forming the liquid crystal layer 4.

Next, the function and effects will be described.

FIG. 3B shows electro-optic characteristics of the liquid crystal cell thus fabricated. As can be seen from FIG. 3B, definite threshold characteristics are exhibited in the vicinity of 2.4 V. Response characteristics are not affected even if an off bias lower than a threshold voltage is applied. The used driving voltage waveform is a voltage waveform of 1/240 Duty and 1/8 bias and a frame frequency of 80 Hz. Assuming that a voltage applied to the liquid crystal layer via the element during an on state is Von and that during an off state is Voff, a ratio Von/Voff is almost 2.0. As can be seen from FIG. 3B, sufficient brightness and contrast are obtained.

With electro-optic characteristics of a liquid crystal cell without an active element, which is obtained under the same conditions as described above, a ratio Von/Voff is 1.07. Therefore, the liquid crystal layer cannot switch transmission/nontransmission due to hysterisis of voltage-transmittance characteristics of the liquid crystal cell.

As described above, in this example, the liquid crystal layer interposed between the back substrate 18 and the front substrate 19 is placed so that the liquid crystal molecules in the vicinity of the interfaces with the substrates are orientated substantially parallel to the surfaces of the substrates. Moreover, the liquid crystal molecules 4a have a helical structure having a helical axis in a thickness direction of the liquid crystal layer owing to the optical active material. Thus, even when a voltage to some degree is applied to the liquid crystal layer 4 in an off state, the orientation of the liquid crystal molecules 4a is not disordered as shown in FIG. 13E. It is not until application of a voltage equal to or higher than a threshold voltage that a pitch of the helical structure rapidly extends (FIG. 13F). Therefore, it is possible to set the dynamic range of the signal voltage within a narrow range including the above threshold value.

Furthermore, since the orientation of the liquid crystal molecules is not disordered even when a voltage to some degree is applied to the liquid crystal layer in an off state, an inexpensive thin film diode 12, with which it is difficult to perfectly reduce a voltage applied to the liquid crystal layer to zero in an off state, can be used as a driving element of the liquid crystal display device. As a result, the cost can be reduced.

Furthermore, a ratio of a natural pitch ($P_0$) and a thickness of the cell (d) is set so as to satisfy the relationship: $(2\theta-\pi)/4\pi < d/p_0\theta/2\pi$, where a twisted angle of the helical structure is $\theta$, and the twisted angle $\theta$ rad of the helical structure is set within the range: $2\pi < \theta < 5\pi/2$. Therefore, the phase transition of the liquid crystal molecules suddenly occurs by applying a predetermined voltage to the liquid crystal layer. Moreover, when the voltage applied to the liquid crystal layer is turned off, the liquid crystal molecules rapidly and certainly return their original state. As a result, sufficiently rapid response characteristics can be obtained.

Since the twisted angle $\theta$ of the helical structure is set at about $9\pi/4$ rad in Example 1, the maximum response characteristics can be obtained.

In Example 1, although the two-terminal element is made of Ta, $Ta_2O_5$ and Ti, a material of the two-terminal element is not limited to the combination of these materials. Any combination of the materials can be used as long as non-linear characteristics of the diode can be obtained as described above.

Moreover, it is not necessary that the two-terminal element be the diode unit: a diode ring or a varistor can also be used. The same effects can also be obtained if a thin film transistor is used instead.

Furthermore, a method for controlling the orientation is not limited to a rubbing method. Other methods such as oblique evaporation can also be used. In Example 1, a thickness of the cell is set at 4.5 μm. However, the desired characteristics can be obtained with the cell having the thickness within the range of 3 to 20 μm.

Although the chiral agent is mixed with the liquid crystal material in Example 1, a cholesteric liquid crystal material can also be used as an optical active material.

Since it is necessary that the retardation ($\Delta n \cdot d$) of the liquid crystal molecules is set so that a light beam incident on the liquid crystal layer passes though the liquid crystal layer without being optically rotated in a form following the twist of the orientation of liquid crystal molecules or in a form close to such a form, it is sufficient that $\Delta n \cdot d \leq 700$ nm, preferably, $\Delta n \cdot d \leq 500$ nm. Since $\Delta n \cdot d = 391$ nm with the liquid crystal material and the thickness of the cell, the incident light passes through the liquid crystal layer without being optically rotated.

Example 2

Figure 4:
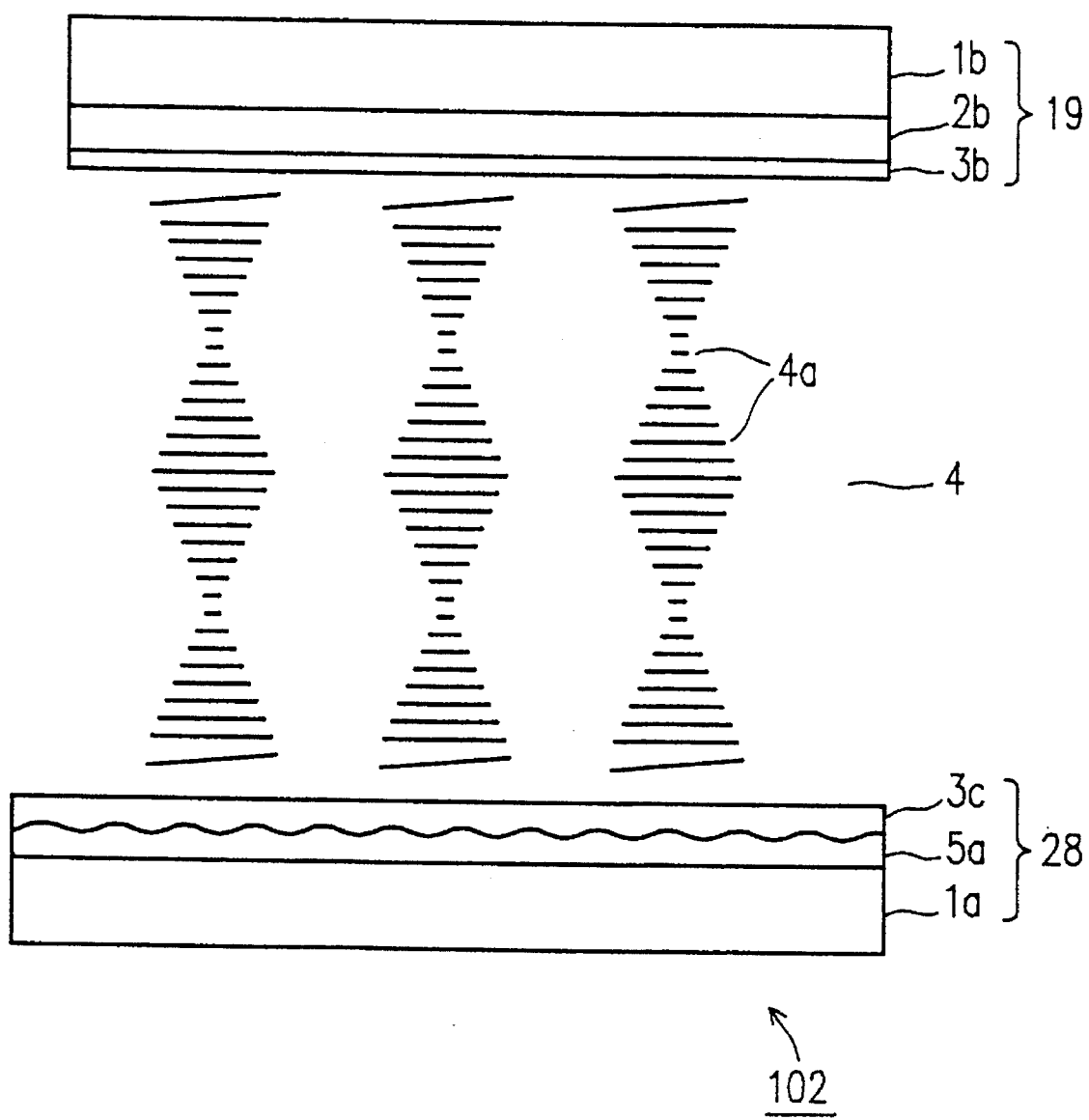
FIG. 4 is a cross-sectional view for illustrating the configuration of a reflection type liquid crystal display device in AWT mode according to Example 2 of the present invention.

FIG. 4 illustrates the structure of a reflection type liquid crystal display device according to Example 2 of the present invention. FIGS. 5A through 5F are cross-sectional views showing a process for manufacturing a reflective pixel electrode constituting the liquid crystal display device in order of the steps. FIG. 6 is a plane view showing an exposure mask used for the fabrication process of the reflective pixel electrode.

In FIG. 4, the reference numeral 102 denotes a reflection type liquid crystal display device in Example 2. The reflection type liquid crystal display device 102 includes a back substrate 28 having a light reflecting layer 5a having a ragged surface and a front substrate 19 formed above the back substrate 28 so as to face the back substrate 28. The light reflecting layer 5a consists of a first photosensitive resin layer 7 which is subjected to patterning so as to have an irregular shape, a second photosensitive resin layer 8 which is thinly formed so as to replicate the irregular shape of the first photosensitive region layer 7, and an Al (aluminum) thin film formed on the photosensitive resin film 8. The light reflecting layer 5a serves as a reflective pixel electrode. In Example 2, the glass substrate 1a constituting the back substrate 28 does not have an active element such as the thin film diode. The same reference numerals as those in FIG. 1 denote the same components as or corresponding components to those in Example 1.

Next, a method for fabricating the reflective pixel electrode of the liquid crystal display device will be described.

Figure 5A:
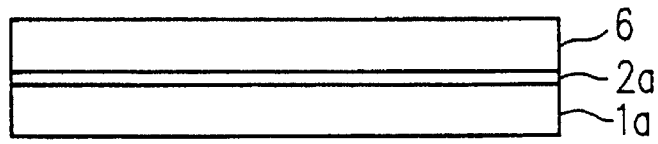
FIGS. 5A to 5F are cross-sectional views showing a fabrication method of a reflective pixel electrode constituting the liquid crystal display device according to Example 2 in order of steps.
Figure 6:
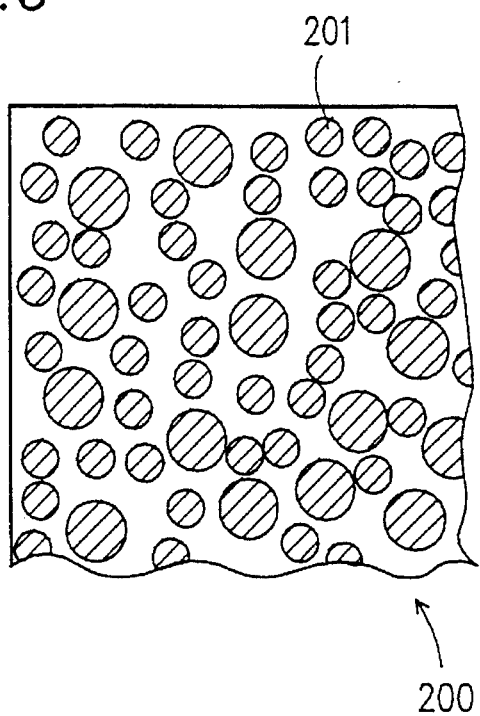
FIG. 6 shows an example of a photomask used in a fabrication process of a reflective pixel electrode in reflection type liquid crystal display devices according to Examples 2 and 4.

A photosensitive film 6 OFPR 800 (trade name), manufactured by Tokyo Ohka Kogyo Co., Ltd., which also serves as a signal electrode, is applied onto the glass substrate 1a, on which the ITO film 2a is formed as a signal electrode, to a predetermined thickness in the range of 0.5 to 1.0 μm by a spincoater (FIG. 5A).

Figure 5B:
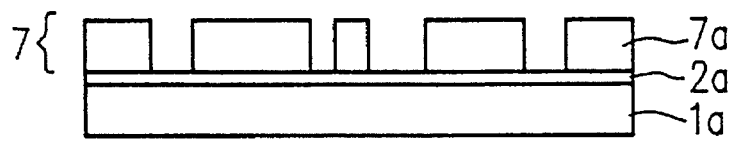

Next, the photosensitive resin film 6 is exposed by a light-shielding mask 200 having a light-shielding pattern 201 as shown in FIG. 6, and then developed, thereby forming the mask layer (the first photosensitive resin film) 7a having an irregular shape (FIG. 5B).

Figure 5C:
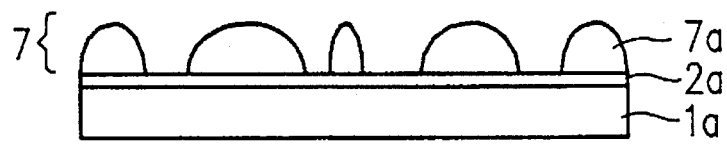

Subsequently, the patterned mask layer 7 is subjected to a thermal treatment at 200° C. so that a convex portion 7a is rounded off (FIG. 5C).

Figure 5D:
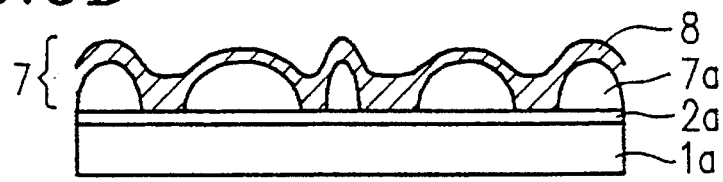

Thereafter, the same or a different photosensitive resin 8 is applied onto the mask layer 7 to the same thickness as that in the step shown in FIG. 5A, and is then subjected to a heat treatment, thereby smoothing the raggedness of the irregular surface (FIG. 5D).

Figure 5E:
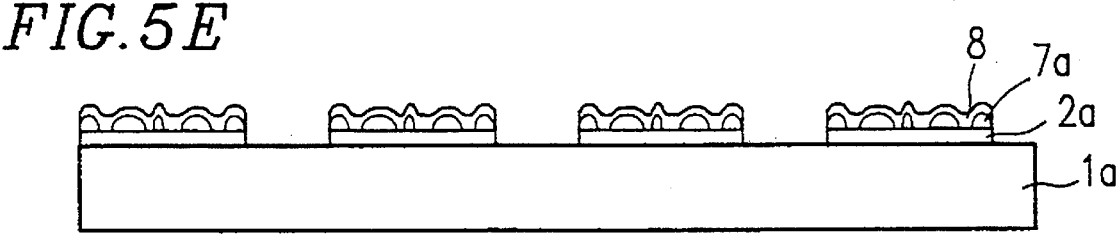
Figure 5F:
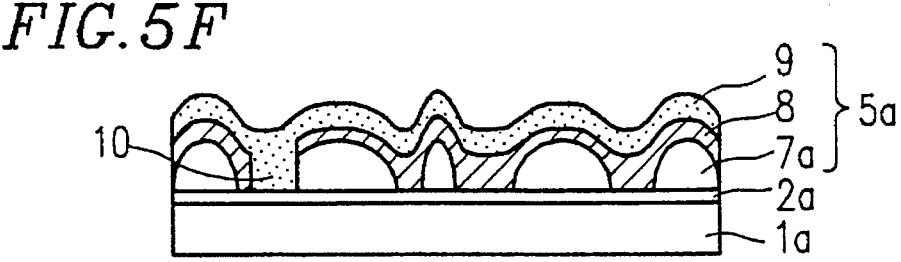

The photosensitive resin film 8 having the smooth irregular surface is processed into the same shape as that of the pixel electrode by photolithography (FIG. 5E).

Furthermore, an Al (aluminum) thin film is formed on the patterned photosensitive resin film 8 as a metal reflective film 9 by sputtering. At this time, the metal reflective film 9 is connected to the signal electrode (ITO film) 2a via a contact hole 10 which is formed through part of the photosensitive resin layer 8 by the photolithography processing. By this step, the metal reflective film 9 functions as the reflective pixel electrode.

By processing the thus formed metal reflective film 9 into a predetermined pixel pattern, the reflective pixel electrode 5a is formed. Then, an alignment film 3c is formed on the entire surface, thereby completing the back substrate 28.

Thereafter, the back substrate 28 having the reflective pixel electrode 5a and the front substrate 19 are attached to each other in the same manner as described in Example 1. Then, a liquid crystal material is injected between the back substrate 28 and the front substrate 19, thereby forming the liquid crystal display element 102.

Next, the function and effects will be described below.

Figure 7:
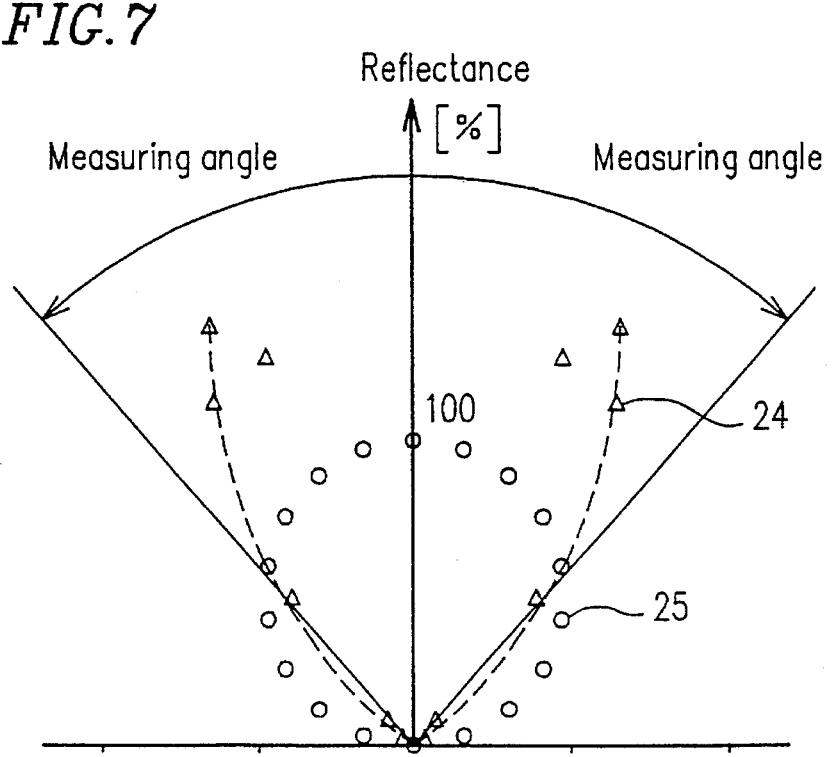
FIG. 7 shows reflection characteristics of the reflective pixel electrode in the reflection type liquid crystal display device according to Example 2.
Figure 8:
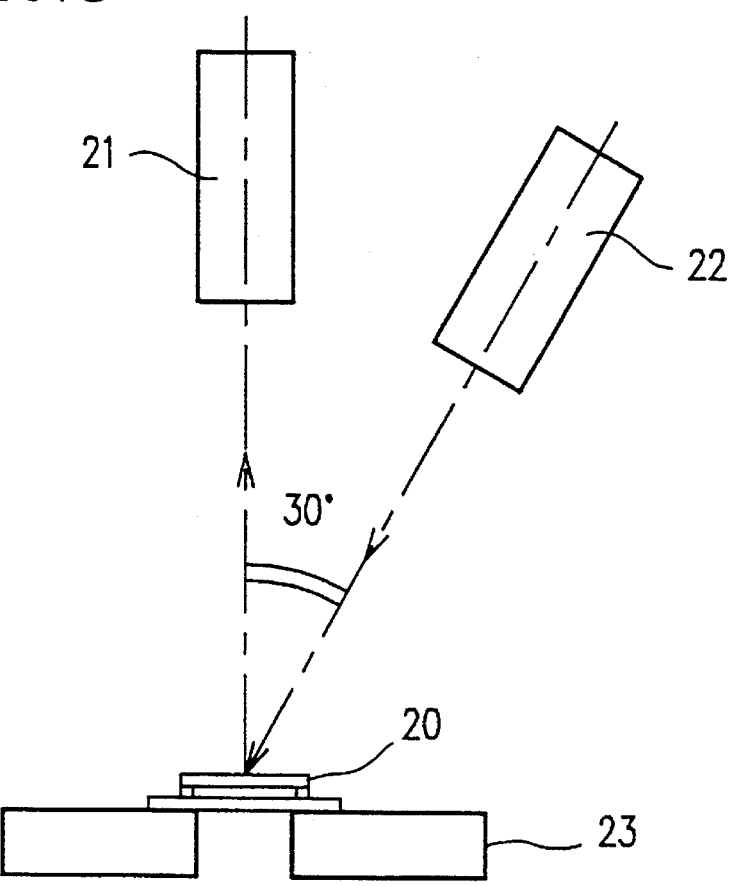
FIG. 8 is a diagram for illustrating a measurement method for measuring reflection characteristics of the reflective pixel electrode.

FIG. 7 shows reflection characteristics of the reflective pixel electrode 5a, and FIG. 8 shows a method for measuring the reflection characteristics.

The measurement of the reflection characteristics is carried out as described below. As shown in FIG. 8, the back substrate 28 is placed on a sample stage 23 as a measured sample 20. Then, a light beam emitted from the light source 22 and then reflected at the surface of the back substrate 28 is detected by a light receiver 21. This measurement is carried out while varying the position of the light receiver 21, regarding the position on the normal of the surface of the measured sample as the center, and fixing the light source 22 to such a position that the emitted light is incident on the surface of the measured sample 20 at an angle. Moreover, in reference, intensity of the reflected light on a standard white face (MgO) is set at 100%.

FIG. 7 shows large reflection characteristics within 30 degrees with respect to the light entering direction, which are the optimum characteristics for the reflection type liquid crystal display device. In FIG. 7, the reflection characteristics of the reflective pixel electrode (light reflecting layer) 5a are denoted by a triangle 24, and the reflection characteristics of the MgO surface are denoted by a circle 25.

Figure 16A:
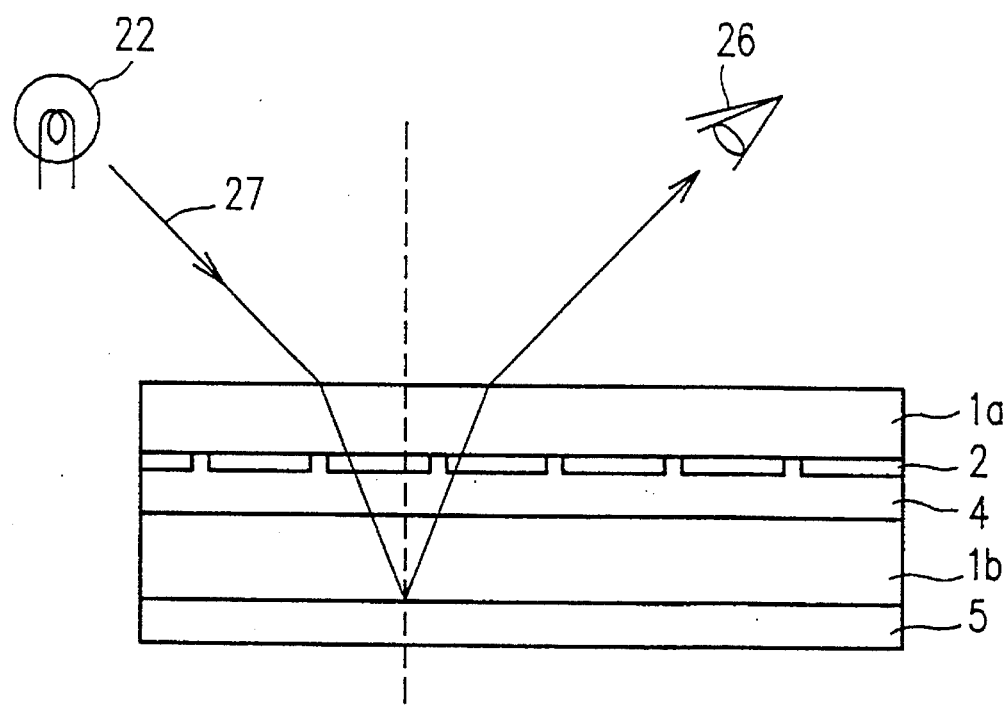
FIGS. 16A and 16B show the relationship between the position where a light reflecting layer is attached and parallax in a conventional reflection type liquid crystal display device.
Figure 16B:
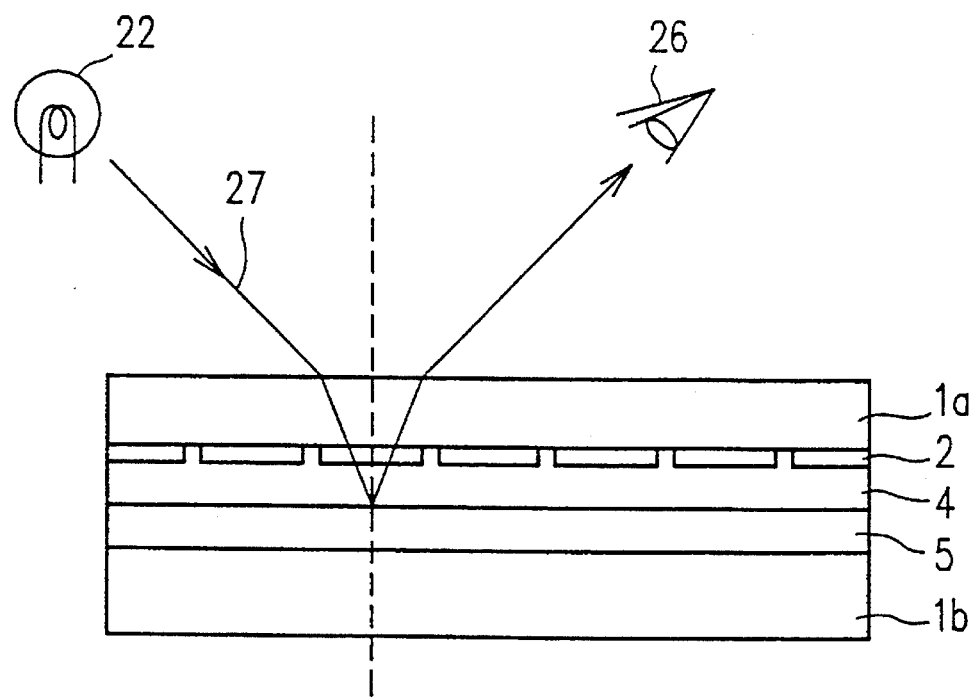

In the liquid crystal display device, parallax is reduced so as to obtain good characteristics over a wide range of field of view as compared with the conventional case where a reflective plate is externally attached as shown in FIG. 16A.

Figure 9:
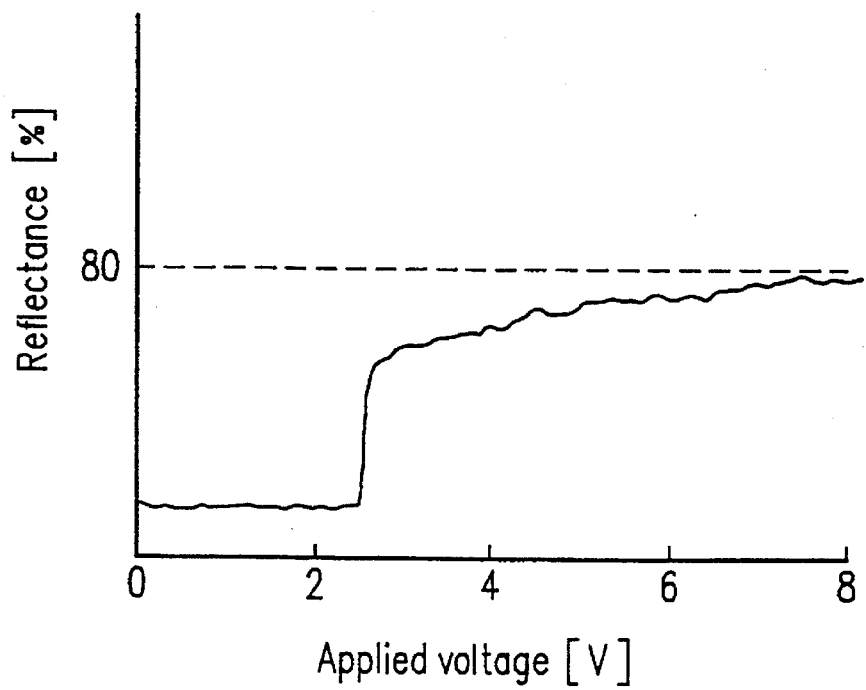
FIG. 9 is a graph showing voltage-reflectance characteristics of the reflective liquid crystal display device according to Example 2.

Furthermore, FIG. 9 shows electro-optic characteristics of the reflection type liquid crystal display device 102. It is understood from the characteristics that the initial orientation state is good and the liquid crystal display device is uniformly driven even when the voltage is applied.

As described above, similarly to Example 1, the dynamic range of the voltage can be set within a narrow range in Example 2. The sufficiently rapid response characteristics can be obtained. In addition, since the reflective pixel electrode (light reflecting layer) 5a consists of the photosensitive resin film 7 having a ragged surface formed on the surface of the substrate, the photosensitive resin film 8 formed on the photosensitive resin film 7 and the metal reflective film 9 formed on the photosensitive resin film 8 so as to replicate the irregularity of the photosensitive resin films, the reflective pixel electrode 5a having a ragged surface can be formed under strict conditions required for the reflective pixel electrode 5a, for example, under the control of a pitch and a height of a convex portion with high precision.

The ITO 2a serving as a signal electrode and the metal reflective film 9 are connected to each other through the contact hole 10 formed through the photosensitive resin layer also serving as the insulating film. However, the metal reflective film 9 may be used as a signal electrode which also serves as a reflective film. In this case, the ITO film 2a serving as a signal electrode is not necessarily formed below the photosensitive resin film 7. At this time, the photosensitive resin layer 6 may be left in the region where the metal reflective film is removed by patterning.

Although Al is used as a metal reflective film in Example 2, a metal material is not limited to Al as long as it has uniform reflection characteristics in a visible light region and a high reflectance.

Example 3

Figure 10A:
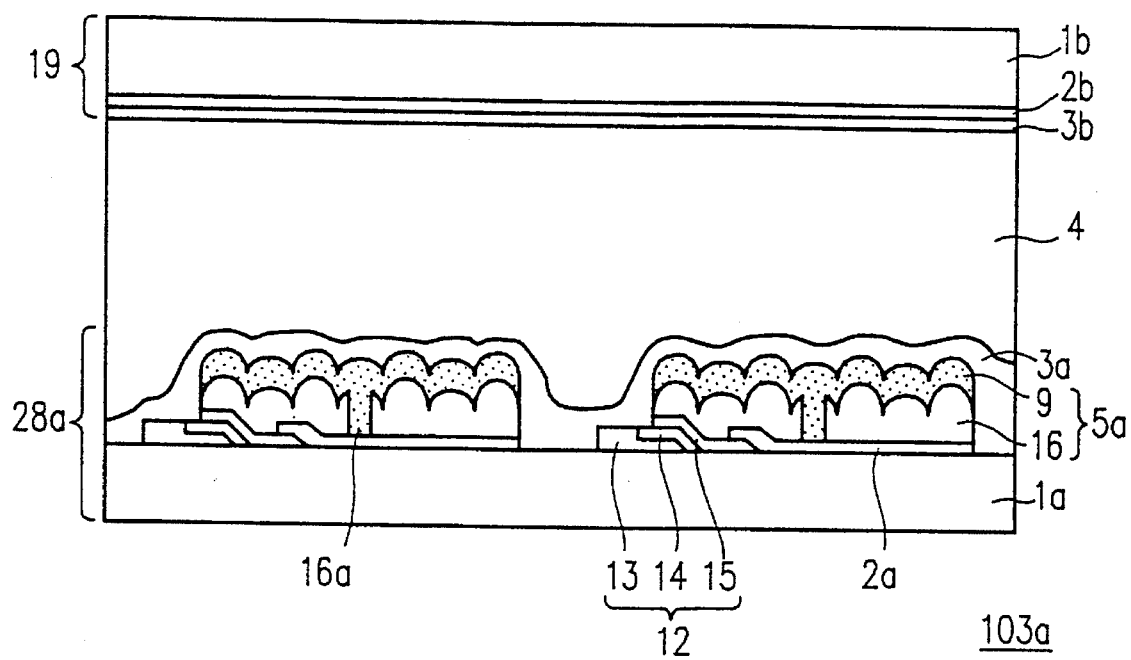
FIGS. 10A and 10B are cross-sectional views showing the configuration of a cell of a reflection type liquid crystal display device having a two-terminal element according to Example 3 of the present invention.

FIG. 10A is a cross-sectional view for illustrating a reflection type liquid crystal display device according to Example 3 of the present invention. In FIG. 10A, the reference numeral 103a denotes a reflection type liquid crystal display device having a two-terminal element, which uses the reflective pixel electrode 5a in Example 3. The thin film diode 12 is mounted on the back substrate 28a as an active element for driving the liquid crystal display device. In Example 3, the reflective pixel electrode 5a consists of a photosensitive resin film 16 having a ragged surface and the metal thin film 9 formed thereon. The metal thin film 9 is connected to the signal electrode 2a through a contact hole 16a formed through the photosensitive resin film 16. In Example 3, similarly to Example 2, the photosensitive resin film 16 consists of a first photosensitive resin film which is patterned by photolithography so as to have an irregular shape, and a second photosensitive region film for smoothing the ragged shape. The same reference numerals as those in FIG. 4 denote the same components as those in Example 2.

A fabrication process of the reflection type liquid crystal display device of Example 2 will be described below.

By the same treatments as those shown in FIGS. 2A and 2D, the thin film diode 12 is formed on the glass substrate 1a. Thereafter, as shown in FIG. 2E, the ITO film 2a is formed as a signal electrode. Then, by the same treatments as those shown in FIGS. 5A and 5F, the photosensitive resin film 16 and the metal thin film 9 are successively formed on the thin film diode 12 and the signal electrode 2a. Then, the liquid crystal alignment film 3a is formed on the entire surface of the glass substrate 1a and is subjected to an orientation treatment, thereby completing the back substrate 28a.

Thereafter, the back substrate 28a and the front substrate 19 are attached to each other in the same manner as in Example 1. Then, the liquid crystal material is injected between the substrates, thereby completing the liquid crystal display element (device) 103a.

Next, the function and effects will be described.

Figure 11:
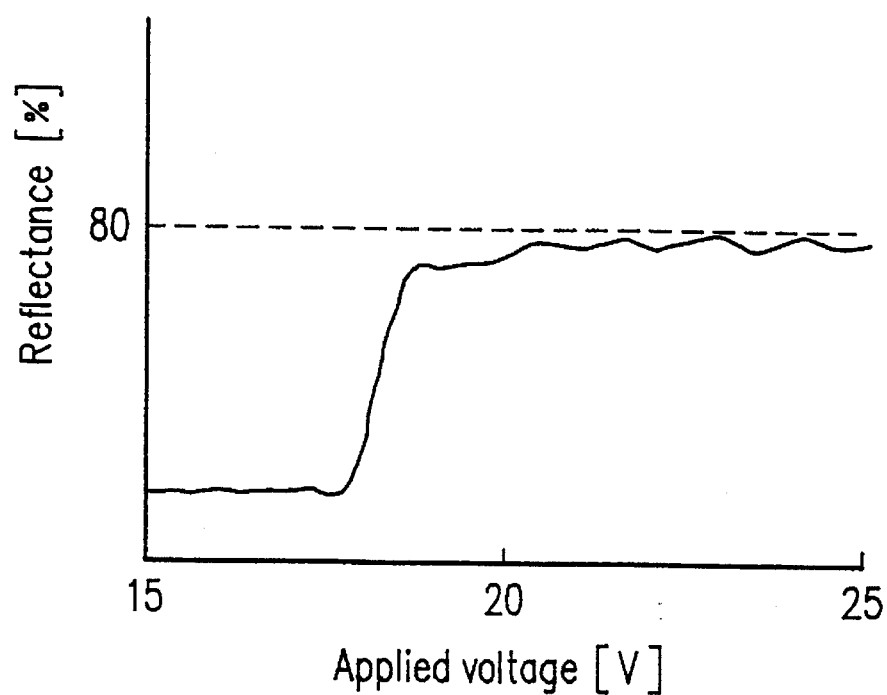
FIG. 11 is a graph showing voltage-reflectance characteristics of the reflection type liquid crystal display device according to Example 3.
Figure 12:
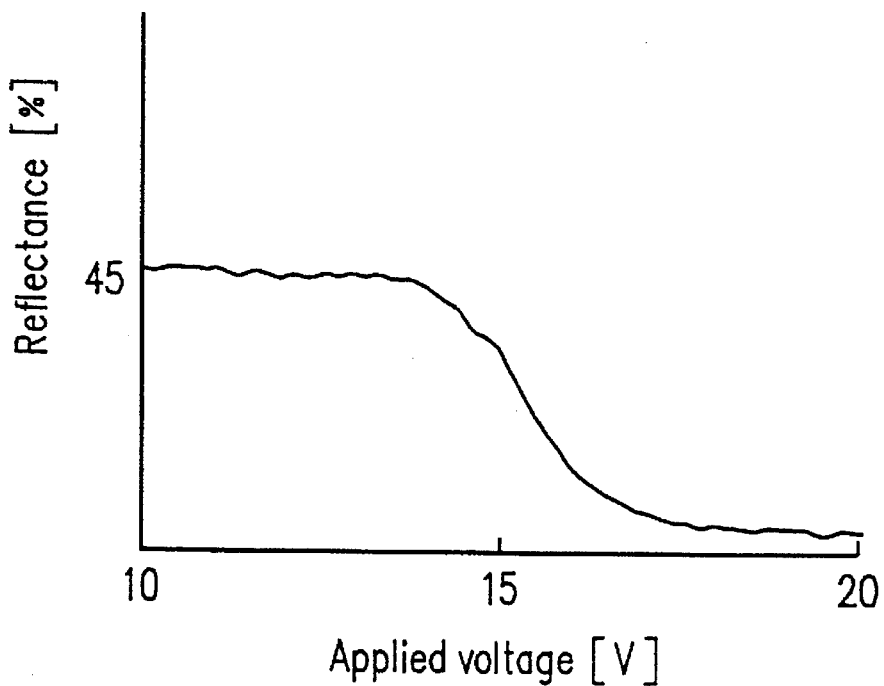
FIG. 12 is a graph showing voltage-reflectance characteristics of a reflection type liquid crystal display device using a TN mode cell.

FIG. 11 shows voltage-reflectance characteristics of the liquid crystal display element 103a. The voltage-reflectance characteristics are compared with the voltage-reflectance characteristic of the reflection type liquid crystal display device using a TN (Twisted-Nematic) mode shown in FIG. 12. It is understood that a display of the reflection type liquid crystal display device in Example 3 is remarkably brighter (80% at the brightest point) as compared with a display of the reflection type liquid crystal display device in a TN mode utilizing a polarizing plate (45% at the brightest point).

As described above, since the switching element is used in Example 3, the liquid crystal display device according to Example 3 is advantageous in that more steep electro-optical characteristics are obtained and the display capacity can be increased as compared with Example 2. In addition, as in Example 2, the reflection type liquid crystal display device having uniform orientation and display characteristics with a small parallax, bright display, and high contrast can be obtained at low cost.

Figure 10B:
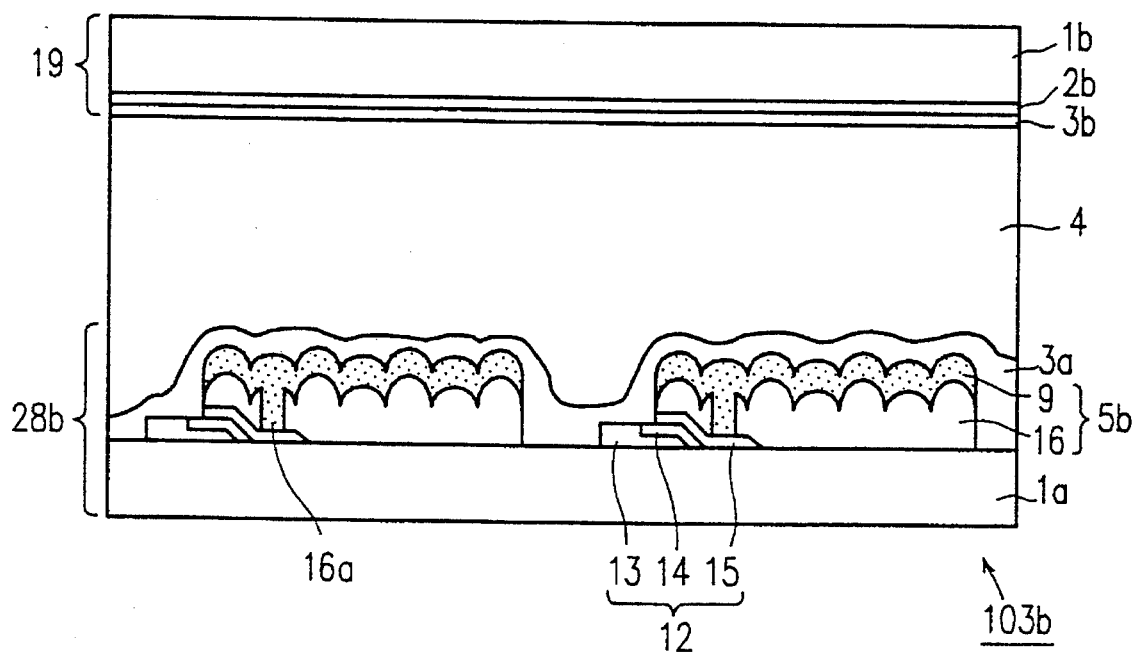

FIG. 10B shows an example of modification of Example 3. In FIG. 10B, the reference numeral 103b is a reflection type liquid crystal display device including an active element mounted thereon according to the modification. The reflection type liquid crystal display device 103b differs from the reflection type liquid crystal display device 103a in that the reflective pixel electrode 5b also serves as the signal electrode 2a in the reflection type liquid crystal display device 103b according to Example 3.

In the reflection type liquid crystal display device 103b, the metal thin film 9 is connected to the Ti electrode 15 of the thin film diode 12 through the contact hole 16a of the photosensitive resin film 16. The back substrate 28b has the signal electrode 2a of Example 3.

A method for fabricating the reflection type liquid crystal display device 103b is the same as that of the reflection type liquid crystal display device 103a: by the same treatments as those shown in FIGS. 2A and 2D, the thin film diode 12 is formed on the glass substrate 1a. However, the method differs from that of Example 3 in that, thereafter, the photosensitive resin film 16 and the metal thin film 9 are successively formed on the thin film diode 12 by the same treatments as those shown in FIGS. 5A and 5F.

The same effects as those in Example 3 can also be obtained in the modification of Example 3 having the above structure.

Example 4

Figure 17A:
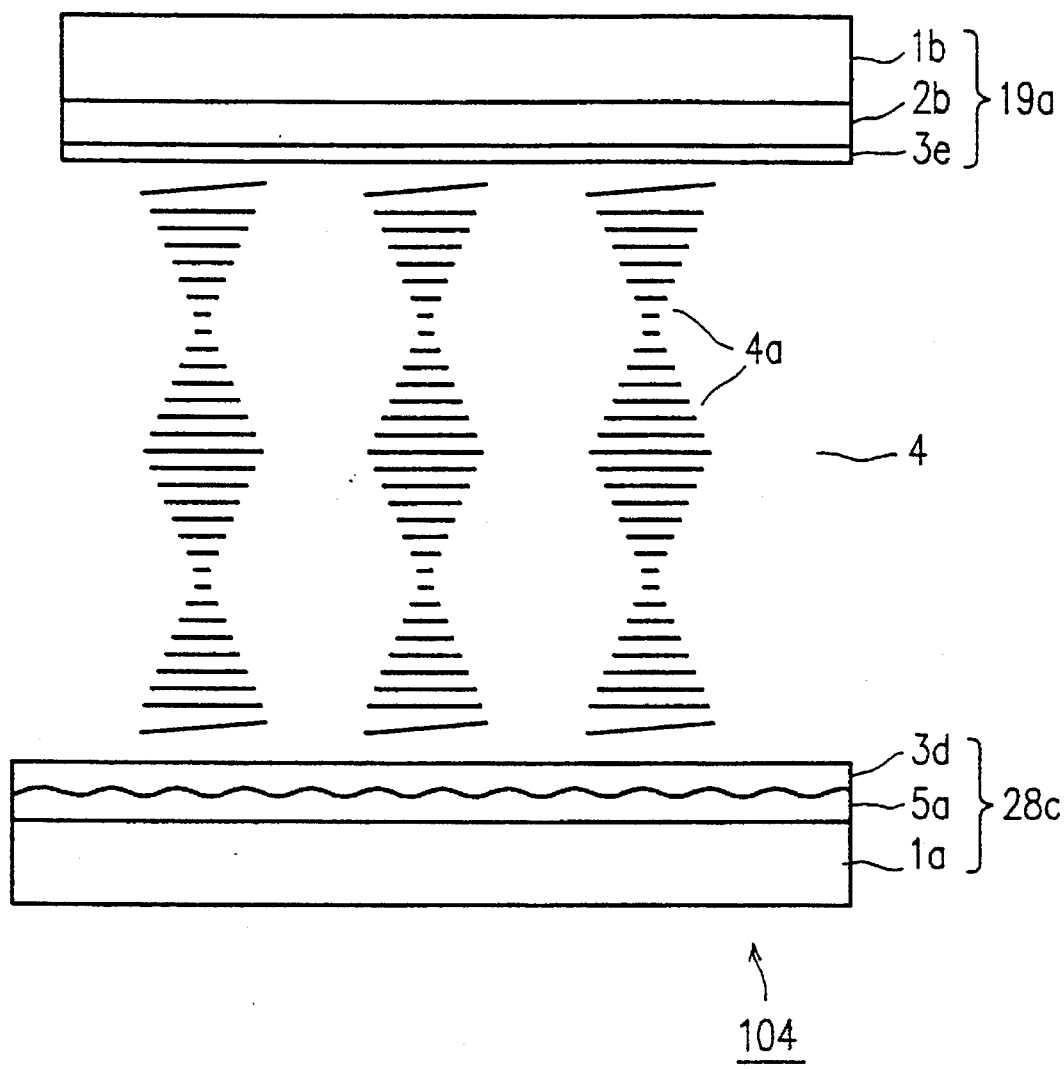
FIG. 17A is a cross-sectional view for illustrating the configuration of a reflection type liquid crystal display device in AWT mode according to Example 4 of the present invention.
Figure 17B:
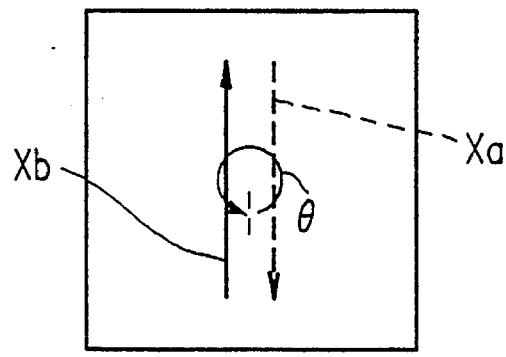
FIG. 17B shows a rubbing direction of a pair of substrates constituting the reflection type liquid crystal display device shown in FIG. 17A.

FIG. 17 illustrates the structure of a reflection type liquid crystal display device according to Example 4. FIG. 17A shows the cross-sectional structure thereof, and FIG. 17B shows a rubbing direction of a pair of substrates constituting the liquid crystal display device. FIGS. 18A to 18F are cross-sectional views showing a fabrication process of a reflective pixel electrode constituting the liquid crystal display device in order of the steps. In FIG. 17A, liquid crystal molecules and pleochroic dyes are not distinguishably shown.

In FIG. 17, the reference numeral 104 denotes a reflection type liquid crystal display device according to Example 4. The reflection type liquid crystal display device 104 includes a back substrate 28c having the light reflecting layer 5a having a ragged surface and the front substrate 19a formed above the back substrate 28c so as to face the back substrate 28c.

Figure 18A:
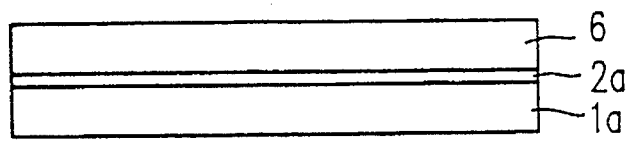
FIGS. 18A through 18F show a method for fabricating a reflective pixel electrode constituting a reflection type liquid crystal display device according to Example 4 in order of steps.
Figure 18B:
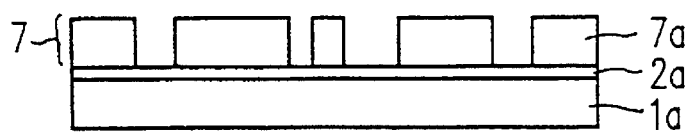
Figure 18C:
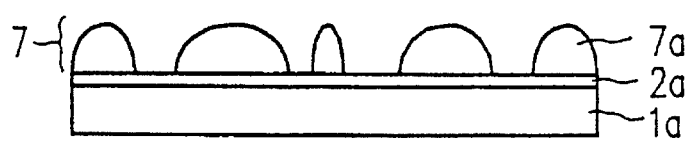
Figure 18D:
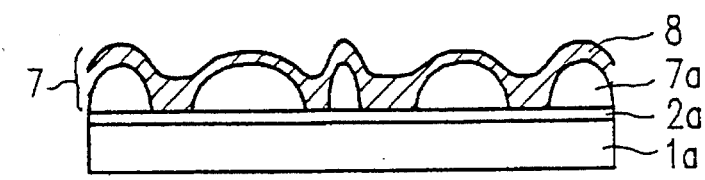
Figure 18E:
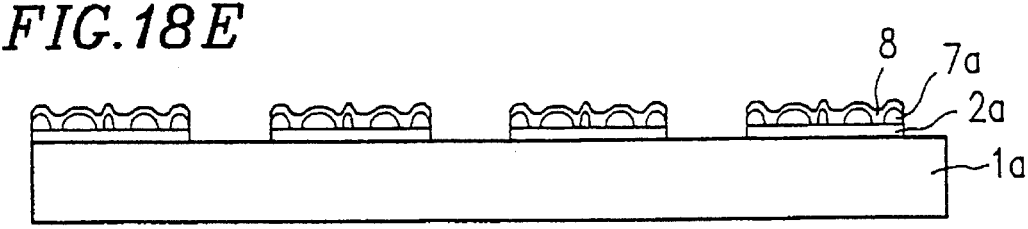
Figure 18F:
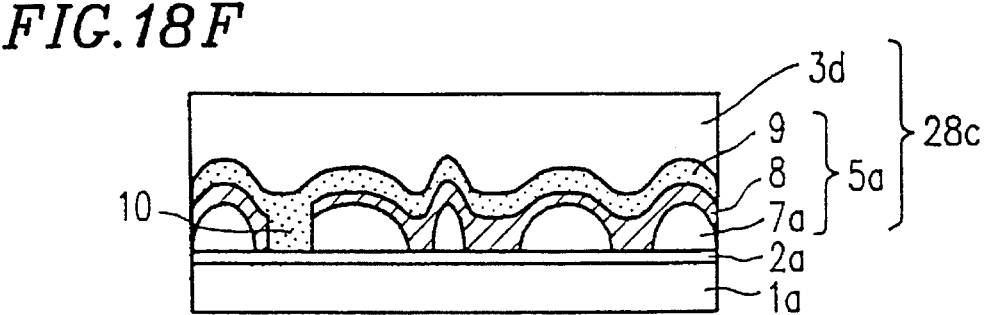

As shown in FIG. 18F, the light reflecting layer 5a consists of the first photosensitive resin layer 7 which is patterned so as to have an irregular shape, the second photosensitive resin layer 8 thinly formed so as to replicate the irregular shape of the photosensitive resin layer 7, and the Al (aluminum) thin film 9 formed on the photosensitive resin layer 8. The light reflecting layer 5a serves as a reflective pixel electrode. An alignment film 3d is formed on the entire surface of the glass substrate 1a so as to cover the reflective electrode 5a. On the glass substrate 1b constituting the front substrate 19a, the stripe-shaped ITO film 2b is formed. An alignment film 3e is formed over the entire surface of the ITO film 2b.

The liquid crystal layer 4 is interposed between the back substrate 28c and the front substrate 19a. The liquid crystal layer 4 is in an AWT mode. The AWT mode is a WT mode in which the liquid crystal molecules 4a at the interfaces with the substrates 28c and 19a are oriented substantially parallel to the surfaces of the respective substrates. In Example 4, a pretilt angle of the liquid crystal molecules are adjusted by the material constituting the alignment films 3d and 3e, intensity of the rubbing treatment, and the like. The pretilt angle of the liquid crystal molecules is set at 5° in this example.

A liquid crystal material used in this example is ZLI-4792 (trade name) fabricated by Merck Co., Ltd., in which anthraquinone and an azoic type black pleochroic dye are mixed. In the liquid crystal material, S-811 (trade name) fabricated by Merck Co., Ltd., serving as a chiral agent which is an optical activator, is mixed at about 1.65 wt%.

At this point, a twisted angle of the orientation of the liquid crystal molecules is 360° as shown in FIG. 17B, and $d/p_0$ is substantially 1. In the liquid crystal material used in this example, a retardation ($\Delta n \cdot d$) of the liquid crystal molecules is set at 470 nm so that a light beam incident on the liquid crystal layer passes through the liquid crystal layer without being optically rotated. Herein, $\Delta n$ is a birefringence of the liquid crystal molecules, and d is a thickness of the cell. Xa is a rubbing direction of the back substrate 28c, and Xb is a rubbing direction of the front substrate 19a.

Next, a method for fabricating the liquid crystal display device according to Example 4 will be described.

The photosensitive film 60FPR 800 (trade name) manufactured by Tokyo Ohka Kogyo Co., Ltd., which also serves as a signal electrode, is applied onto the glass substrate 1a on which the ITO film 2a is formed as a signal electrode, to a predetermined thickness in the range of 0.5 to 1.0 μm by a spincoater (FIG. 18A).

Next, the photosensitive resin film 6 is exposed to light by using the light-shielding mask 200 having the light-shielding pattern 201 shown in FIG. 6, and then developed, thereby forming the mask layer (the first photosensitive resin film) 7 having an irregular shape (FIG. 18B).

Subsequently, the patterned mask layer 7 is subjected to a thermal treatment at 200° C. so that the convex portion 7a is rounded off (FIG. 18C).

Thereafter, the same or a different photosensitive resin 8 is applied onto the mask layer 7 to the same thickness as that in the step shown in FIG. 5A, and is then subjected to a heat treatment, thereby smoothing the raggedness of the irregular surface (FIG. 18D).

The same or different photosensitive resin film 8 is applied onto the thermally treated mask 7 to approximately the same thickness as that shown in FIG. 18A, thereby smoothing the raggedness of the irregular surface (FIG. 18D).

The photosensitive resin film 8 having the irregular surface is processed into the same shape as that of the pixel electrode by photolithography (FIG. 18E).

An Al (aluminum) thin film is formed on the patterned photosensitive film 8 by sputtering as a metal reflective film 9. At this time, the metal reflective film 9 is connected to the signal electrode (ITO film) 2a through a contact hole 10 formed though part of the photosensitive resin layer 8 in photolithography. Specifically, the metal reflective film 9 functions as a reflective pixel electrode.

The metal reflective film 9 thus formed is processed so as to have a predetermined pixel pattern, thereby forming the reflective pixel electrode 5a. Furthermore, a material of the alignment film K is applied onto the entire surface, and then is burnt at 180° C. for one hour, thereby completing the alignment film 3d. As a result, the back substrate 28c is completed.

A pair of glass substrates having ITO thus obtained are attached to each other so that a twisted angle of the orientation of the liquid crystal molecules is 360°. After a liquid crystal material mixed with dyes is sealed between the glass substrates, a pretilt angle is measured by a magnetic field-capacitance method. The measured pretilt angle is 5°. A pretilt angel is measured for an alignment film material J which differs from the alignment film material K, in the same manner as the measurement of the alignment film material K. The measured pretilt angle is 1°. A pretilt angle can be selected not only by selecting the type of the material for the alignment film but also by changing the strength of a rubbing treatment with the same material.

On the other hand, regarding the front substrate 19a, an ITO film is formed on the glass substrate 1b. The ITO film is subjected to patterning so as to form a stripe shaped ITO film 2b. Thereafter, similarly to the glass substrate 1a on the side of the back substrate 28c, an alignment film material K is applied onto the glass substrate 1b. Then, the alignment film material K is burnt at 180° C. for one hour, thereby forming an alignment film 3e.

The alignment films 3d and 3e of the glass substrates 1a and 1b are subjected to a rubbing treatment so that the orientation directions of the liquid crystal molecules on the alignment films form 360°.

Thereafter, glass bead spacers having a diameter of 4.5 µm are diffused in one of the back substrate 28c and the front substrate 19a. Then, an adhesive sealing material containing glass fibers having a diameter of 5 µm mixed therein is screen-printed as a liquid crystal sealing layer. The substrates 28c and 19a are attached to each other so that the Ta signal line (wiring) of the back substrate 28c and the stripe-shaped ITO film 2b of the front substrate 19a perpendicularly cross each other in a matrix form. Then, a liquid crystal material is injected between the substrates 28c and 19a by vacuum injection, thereby forming the liquid crystal layer 4.

Next, the function and effects will be described.

Figure 19A:
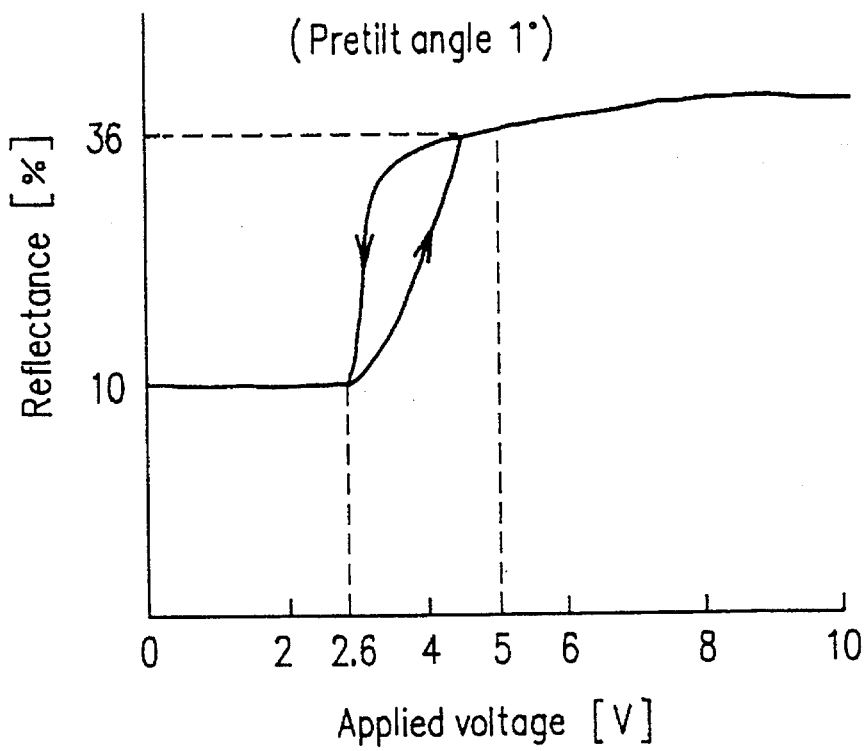
FIGS. 19A and 19B are graphs showing voltage-reflectance characteristics of the reflection type liquid crystal display device according to Example 4.
Figure 19B:
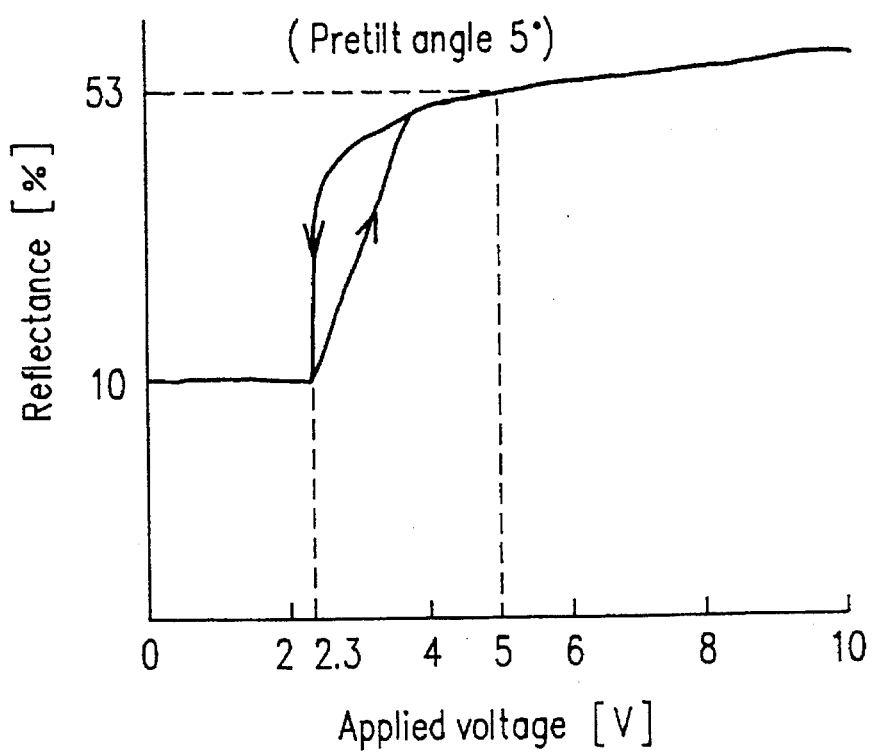

FIGS. 19A and 19B show electro-optic characteristics of the thus fabricated liquid crystal cell. A driving voltage waveform used in this case has 1/240 Duty and 1/8 bias, and a frame frequency is 40 Hz.

FIG. 19A shows electro-optic characteristics of the liquid crystal cell fabricated using the alignment film material J, and FIG. 19B shows electro-optic characteristics of the liquid crystal cell fabricated using the alignment film material K. As seen from FIGS. 19A and 19B, in the case where the alignment film material K is used, a voltage at which the pitch of the helical structure of the liquid crystal molecules 4a begins to extend is 2.3 V. Specifically, the obtained value of the voltage is lower than that of the case where the alignment film material J is used, that is, 2.6 V. Thus, a threshold voltage is lowered.

The reflectance during an off state is the same in the both cases where the alignment film material J is used and where the alignment film material K is used. However, when a voltage applied to the liquid crystal layer is in an on state, the reflectance of the liquid crystal cell with the alignment film material K becomes high. When contrast is expressed by a ratio of the reflectance when an applied voltage is 0 V and the reflectance when an applied voltage is 5 V, the contrast in the case of the liquid crystal cell with the alignment film material K is 5.3. This value is higher than that of the liquid crystal cell with the alignment film material J, that is, 3.6.

Generally, the contrast of a newspaper is approximately 5. It is desired that the reflection type liquid crystal display device has the contrast equal to or higher than 5.

As described above, in Example 4, the threshold voltage can be set at a low value by changing the material of the alignment film so as to improve a pretilt angle of the liquid crystal molecules. As a result, the contrast of the display can be improved.

Figure 20:
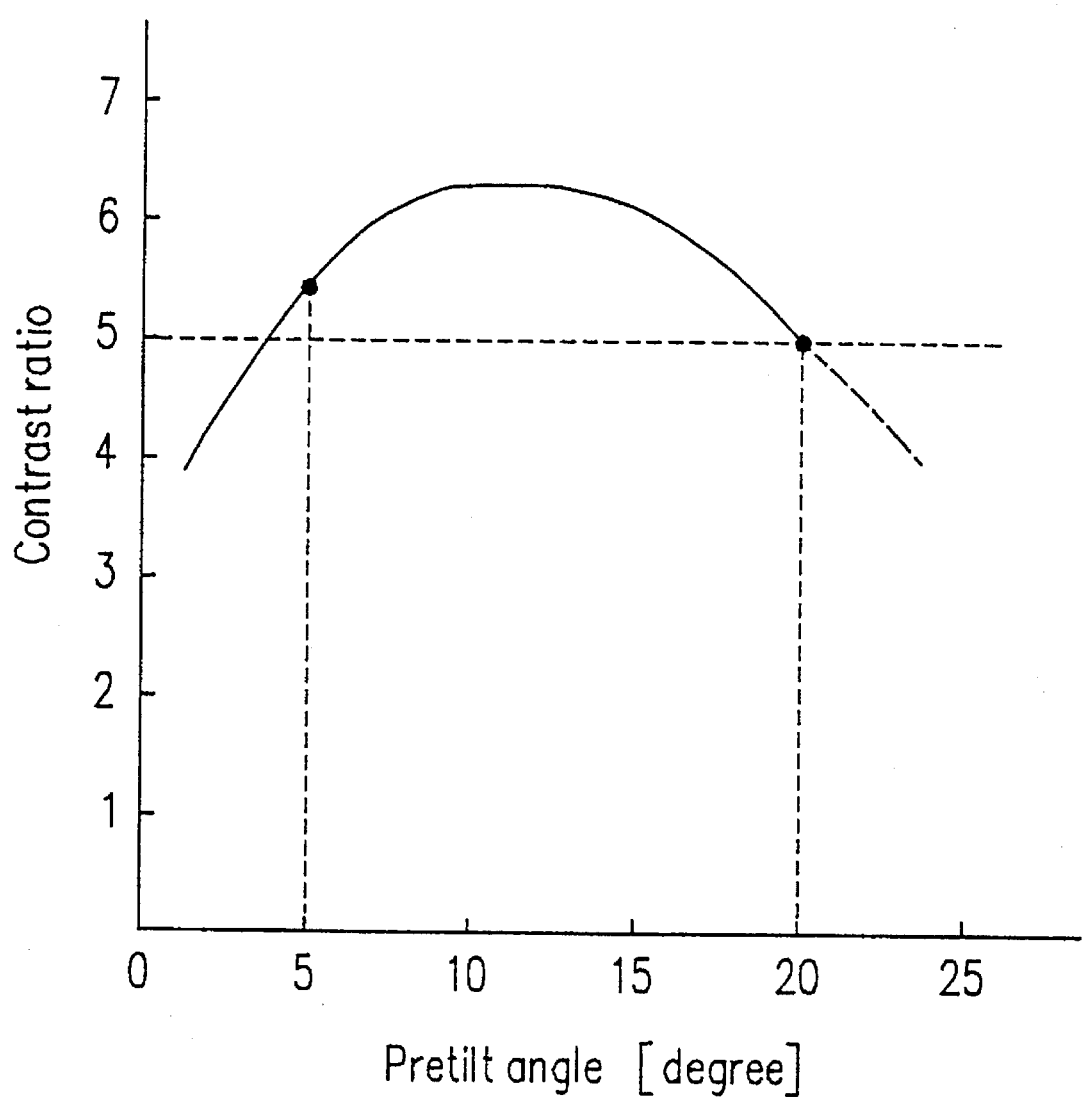
FIG. 20 is a graph showing the relationship between a pretilt angle and contrast in the reflection type liquid crystal display device according to Example 4.

In Example 4 described above, the alignment film material K, with which a pretilt angle of the liquid crystal molecules of 5° is obtained, is used. However, the same effects can be obtained as long as the pretilt angle of the liquid crystal molecules is within the range of 5° to 20°. When the pretilt angle exceeds 20°, a threshold voltage is lowered in the same manner. Since the reflectance during an off state of the voltage increases as the reflectance during an on state of the voltage increases, the contrast is lowered (see FIG. 20). Therefore, it is preferred that a pretilt angle of the liquid crystal molecules is in the range of 5° to 20°. A pretilt angle of the liquid crystal molecules can also be set within the above range by adjusting the strength of a rubbing treatment.

The ITO 2a serving as the signal electrode and the metal reflective film 9 are connected to each other through the contact hole 10 formed through the photosensitive resin layer which also serves as an insulating layer in Example 4. However, the metal reflective film 9 can be used as a signal electrode which also serves as a reflective film. In this case, the ITO film 2a serving as the signal electrode is not necessarily formed below the photosensitive resin film 7. Moreover, the photosensitive resin layer 6 may be left in the portion where the metal reflective film is removed by patterning.

Although Al is used as a metal reflective film in Example 4, a metal material is not limited to Al as long as the metal has uniform reflection characteristics in a visible light region and a high reflectance.

Not only a rubbing method but also oblique evaporation can be used as the method for controlling the orientation. Although a thickness of the cell is set at 5 µm in Example 4, the desired characteristics can be obtained with the thickness in the range of 3 to 20 µm.

Although a chiral agent is mixed in the liquid crystal material as an optical active material in Example 4, a cholesteric liquid crystal material can also be used as the optical active material.

Although the case where a twisted angle is 360° is shown in Example 4 described above, the twisted angle is not limited to 360° as long as it is within the above-mentioned range ($2\pi \leq \theta \leq 5\pi/2$) according to the present invention.

As described above, according to the present invention, a liquid crystal display device in a bright display mode which has electro-optical characteristics with a definite threshold and sufficiently rapid response characteristics in which the orientation state of the liquid crystal molecules does not change even if an off bias is applied thereto, and which can be driven at a low voltage, can be realized. Therefore, an active element such as a TFT or a two-terminal element can be used as a driving element of the liquid crystal device. Furthermore, by providing a reflective pixel electrode having good diffuse reflection characteristics which is formed so as to be in contact with the liquid crystal layer for the liquid crystal display device, a reflection type liquid crystal display device having uniform orientation and display characteristics with a small parallax, a bright display and high contrast, which can be fabricated at low cost, can be obtained.

Since the alignment film is formed so that a pretilt angle of the liquid crystal molecules constituting the liquid crystal layer is in the range of 5° to 20°, a threshold voltage can be set at a lower value. As a result, the contrast can be further improved.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A liquid crystal display device comprising:

a pair of substrates, at least one of which is transparent; and a liquid crystal layer interposed between the pair of substrates, the liquid crystal layer having a helical structure including: a liquid crystal material having a positive dielectric constant anisotropy; a pleochroic dye; and at least one of a cholesteric liquid crystal material and a chiral agent as an optical active material, wherein the liquid crystal layer has a helical axis in a thickness direction of the liquid crystal layer, and longitudinal axes of liquid crystal molecules in a vicinity of the pair of substrates are substantially parallel to the substrates, a ratio of a natural pitch ($p_0$) and a thickness (d) of the liquid crystal layer of the helical structure satisfies a relationship: $(2\theta-\pi)/4\pi < d/p_0 \leq \theta/2\pi$, where a twisted angle of the helical structure is $\theta$ rad, and the twisted angle $\theta$ rad of the helical structure is within a range: $2\pi \leq \theta \leq 5\pi/2$.

2. A liquid crystal display device according to claim 1, wherein one of the pair of substrates further includes an active element for switching a voltage applied to the liquid crystal layer.

3. A liquid crystal display device according to claim 2, wherein the active element is a non-linear element which is selected from a group consisting of a MIM, a diode, a varister, and a thin film transistor (TFT).

4. A liquid crystal display device according to claim 1, wherein one of the pair of substrates has a reflective pixel electrode which is provided so as to be in contact with the liquid crystal layer, and wherein the reflective pixel electrode consisting of an insulating film having a ragged surface and a metal reflective film which is formed so as to replicate the ragged surface of the insulating film.

5. A liquid crystal display device according to claim 1, wherein the twisted angle $\theta$ of the helical structure is about $9\pi/4$.

6. A liquid crystal display device according to claim 1, wherein each of the pair of substrates has an alignment film which is formed such that a pretilt angle of the liquid crystal molecules constituting the liquid crystal layer is within a range of 5° to 20°.

7. A liquid crystal display device according to claim 2, wherein one of the pair of substrates has a reflective pixel electrode which is provided so as to be in contact with the liquid crystal layer, and wherein the reflective pixel electrode consisting of an insulating film having a ragged surface and a metal reflective film which is formed so as to replicate the ragged surface of the insulating film.

8. A liquid crystal display device according to claim 2, wherein the twisted angle $\theta$ of the helical structure is about $9\pi/4$.

9. A liquid crystal display device according to claim 2, wherein each of the pair of substrates has an alignment film which is formed such that a pretilt angle of the liquid crystal molecules constituting the liquid crystal layer is within a range of 5° to 20°.

\* \* \* \* \*